United States Patent
Rambadt et al.

(10) Patent No.: US 9,424,728 B2
(45) Date of Patent: Aug. 23, 2016

(54) CHILD SAFETY SEAT MOBILE ALARM AND METHOD THEREFOR

(71) Applicants: Amy Rambadt, Gravette, AR (US); John Rambadt, Gravette, AR (US); David Tanner, Fayetteville, AR (US); Ken Kehler, Gravette, AR (US); Joseph David Strickland, Siloam Springs, AR (US)

(72) Inventors: Amy Rambadt, Gravette, AR (US); John Rambadt, Gravette, AR (US); David Tanner, Fayetteville, AR (US); Ken Kehler, Gravette, AR (US); Joseph David Strickland, Siloam Springs, AR (US)

( * ) Notice: Subject to any disclaimer, the term of this patent is extended or adjusted under 35 U.S.C. 154(b) by 0 days.

(21) Appl. No.: 14/284,004

(22) Filed: May 21, 2014

(65) Prior Publication Data
US 2014/0253314 A1   Sep. 11, 2014

Related U.S. Application Data

(63) Continuation-in-part of application No. 14/035,410, filed on Sep. 24, 2013.

(60) Provisional application No. 61/969,574, filed on Mar. 24, 2014, provisional application No. 61/704,811, filed on Sep. 24, 2012, provisional application No. 61/788,037, filed on Mar. 15, 2013.

(51) Int. Cl.
| | |
|---|---|
| *G08B 1/08* | (2006.01) |
| *G08B 21/02* | (2006.01) |
| *G08B 21/24* | (2006.01) |
| *B60K 28/06* | (2006.01) |
| *B60N 2/00* | (2006.01) |
| *B60N 2/28* | (2006.01) |

(52) U.S. Cl.
CPC .......... *G08B 21/0266* (2013.01); *B60K 28/066* (2013.01); *B60N 2/002* (2013.01); *G08B 21/24* (2013.01); *B60N 2002/2815* (2013.01)

(58) Field of Classification Search
CPC .... G08B 21/22; G08B 21/24; G08B 21/0266; B60K 28/066; B60N 2/002; B60N 2/28
USPC ................................ 340/539.13, 573.4, 457.1
See application file for complete search history.

(56) References Cited

U.S. PATENT DOCUMENTS

| | | | |
|---|---|---|---|
| D306,099 S | 2/1990 | Kassai | D6/333 |
| 5,581,234 A | 12/1996 | Emery et al. | 340/457.1 |
| 5,793,291 A | 8/1998 | Thornton | 340/573 |
| 5,966,070 A | 10/1999 | Thornton | 340/425.5 |
| 6,028,509 A | 2/2000 | Rice | 340/449 |
| 6,104,293 A | 8/2000 | Rossi | 340/573.1 |
| 6,812,844 B1 | 11/2004 | Burgess | 340/573.1 |
| 6,909,365 B2 | 6/2005 | Toles | 340/457 |
| 6,924,742 B2 | 8/2005 | Mesina | 340/573.1 |
| 6,998,988 B1 | 2/2006 | Kalce | 340/573.1 |
| 7,106,207 B1 | 9/2006 | Marchan | 340/667 |
| 7,224,270 B2 | 5/2007 | Patterson et al. | 340/457.1 |
| 7,321,306 B2 | 1/2008 | Lee et al. | 340/572.1 |
| 7,378,979 B2 | 5/2008 | Rams, Jr. | 340/667 |
| 7,391,310 B2 | 6/2008 | Ito et al. | 340/457.1 |
| 7,466,217 B1 | 12/2008 | Johnson et al. | 340/425.5 |

(Continued)

*Primary Examiner* — Thomas Mullen
(74) *Attorney, Agent, or Firm* — Wright Lindsey Jennings LLP; Meredith Lowry

(57) ABSTRACT

The instant disclosure provides a child safety seat alarm to notify the driver of a vehicle that an infant is in its carrier inside of the vehicle when a personal electronic device carried by the driver is moved a great distance from the carrier. The instant disclosure provides a computer application for notification of user selected contacts via SMS messaging, e-mail messaging, or social media alerts.

8 Claims, 19 Drawing Sheets

(56) References Cited

U.S. PATENT DOCUMENTS

| | | | |
|---|---|---|---|
| 7,714,737 B1 | 5/2010 | Morningstar | 340/667 |
| 7,733,228 B2 | 6/2010 | Lee et al. | 340/572.1 |
| 8,063,788 B1 | 11/2011 | Morningstar | 340/667 |
| 8,120,499 B2 | 2/2012 | Ortiz | 340/573.1 |
| 8,125,343 B2 | 2/2012 | Denale | 340/573.1 |
| 8,217,796 B2 | 7/2012 | Trummer | 340/573.1 |
| 8,289,145 B2 | 10/2012 | Miller et al. | 340/457.1 |
| 8,378,801 B1 | 2/2013 | Freeman et al. | 340/426.17 |
| 8,451,110 B2 | 5/2013 | Takeshita | 340/457.1 |
| 8,659,414 B1 | 2/2014 | Schuk | 340/457 |
| 2003/0122662 A1* | 7/2003 | Quinonez | 340/457 |
| 2009/0079557 A1 | 3/2009 | Miner | 340/457.1 |
| 2013/0021476 A1* | 1/2013 | Trummer | B60R 22/48 348/148 |
| 2013/0033373 A1* | 2/2013 | Thomas | 340/457.1 |
| 2013/0106598 A1 | 5/2013 | Silveira | 340/457.1 |
| 2014/0015664 A1 | 1/2014 | Watson | 340/457.1 |
| 2014/0052342 A1 | 2/2014 | Seibert | 340/457.1 |

* cited by examiner

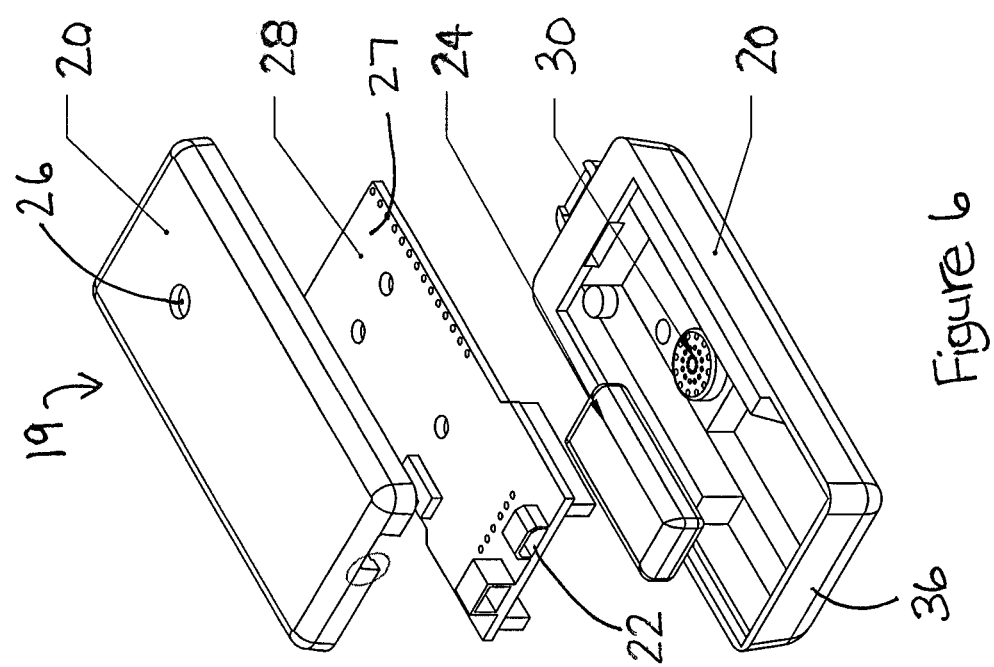

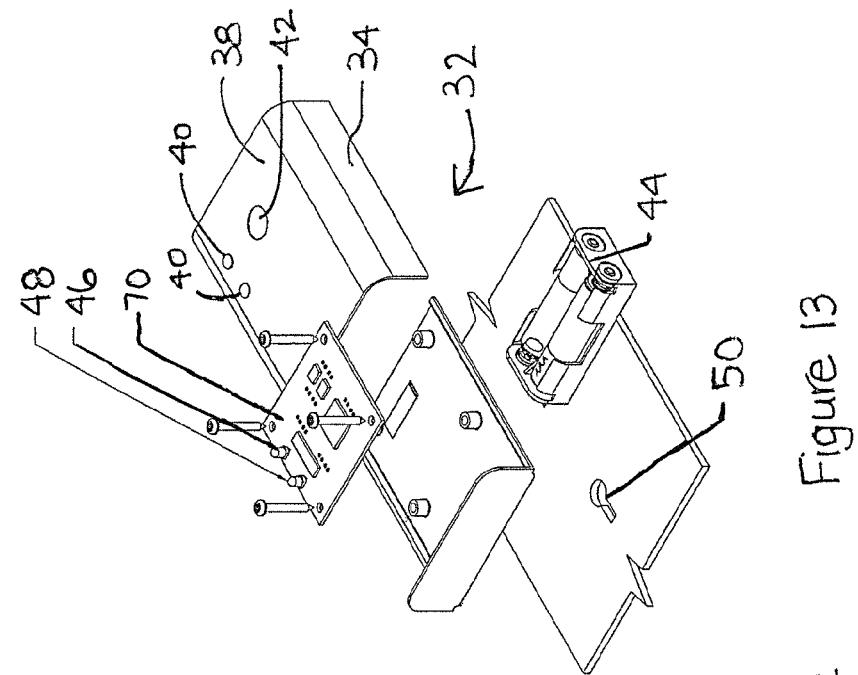
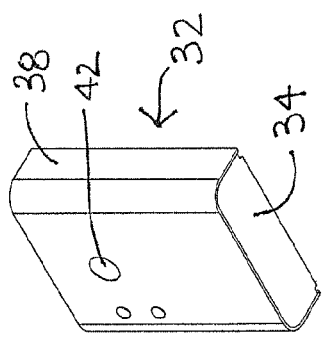
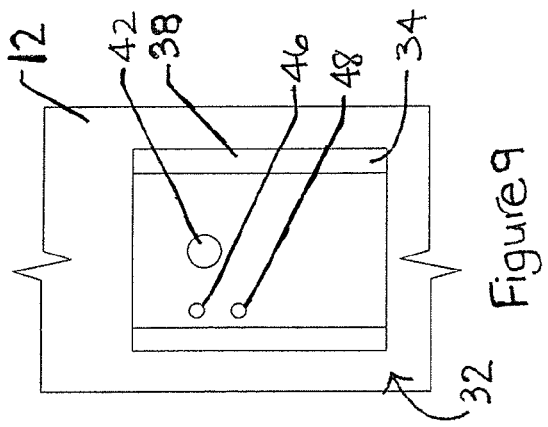
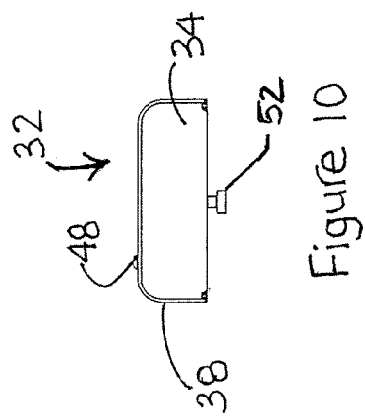

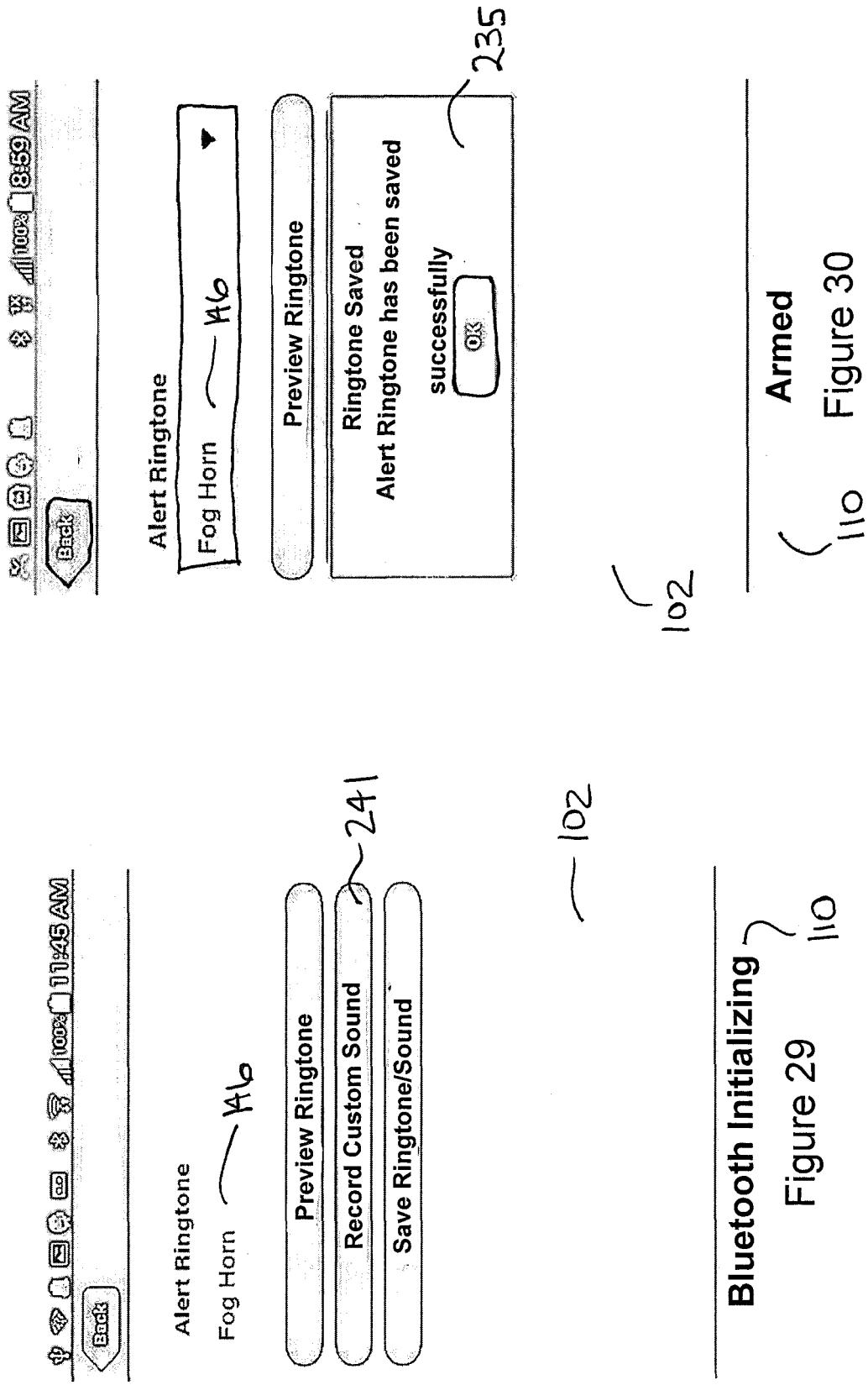

Connecting...

Connecting...

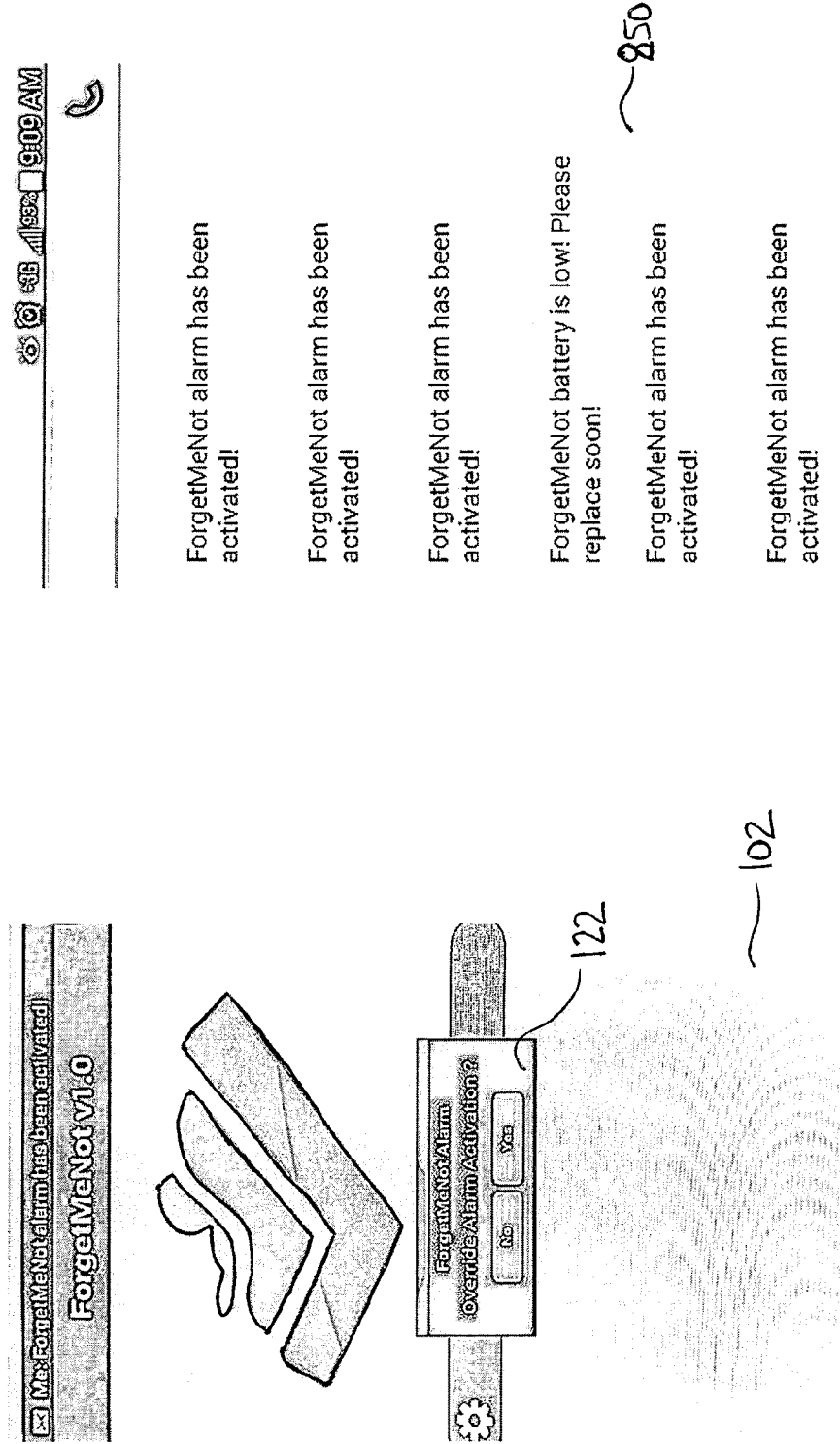

CHILD SAFETY SEAT MOBILE ALARM AND METHOD THEREFOR

CROSS-REFERENCE TO RELATED APPLICATIONS

This application claims priority to and is a continuation-in-part of U.S. Provisional Patent Application Ser. No. 61/969,574 filed on Mar. 24, 2014 and claims priority to and is a continuation-in-part of U.S. patent application Ser. No. 14/035,410 filed on Sep. 24, 2013, now U.S. Pat. No. 9,189,943, which itself claims priority to U.S. Provisional Application Ser. No. 61/704,811 filed on Sep. 24, 2012 and Ser. No. 61/788,037 filed on Mar. 15, 2013, the disclosures of which are hereby incorporated by reference herein in their entireties and are all commonly owned.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to a child safety seat with alarm for use in connection with transporting infants in vehicles. The child safety seat with alarm has particular utility in connection with notifying the driver of a vehicle that an infant is in its carrier inside of the vehicle when the driver moves away from the vehicle.

2. Description of the Known Art

Child safety seats with alarms are desirable for notifying the driver of a vehicle that an infant is in its carrier inside of the vehicle. Children frequently fall asleep when being transported in vehicles. As a result, it is possible for a driver to forget that they are transporting a child if the baby remains quiet for a long period of time. Forgetting a child inside of a vehicle can result in severe injury to or the death of the child from extreme temperature conditions and/or dehydration. Child safety seats with alarms not only protect the child in the event of accident, but also remind the driver of the presence of the child through visual and audio alerts.

The use of child alert systems for automobiles is known in the prior art. For example, U.S. Patent Publication 20140015664 to Watson discloses a child car seat system that alarms a guardian of a child that the child has accidently been left in the child car seat. The system comprises of a child car seat that has seat belt that is wired to a transmitter, the seat belt has a first terminal and second terminal locking latch, when the first terminal and second terminal locking latches are latched to each other, a closed electrical loop is formed and a first signal is transmitted from the transmitter, when the first and second terminal locking latches are unlatched, a second signal is transmitted from the transmitter. The system further comprises of a receiver, the receiver defines at least one alarm that warns the user of the system that a child has been left in the child car seat, the receiver activates when it receives the first signal and deactivated when it receives the second signal, the receiver has a sensor that will activate the alarm if the receiver is moved a certain distance away from transmitter when the receiver is activated. The receiver can be a key fob, but does not contemplate other signal technology, such as Bluetooth®, nor is there an ability to signal multiple receivers. Further, the system does not contemplate a second car seat in another vehicle for another guardian.

U.S. Patent Publication 20140052342 to Seibert discloses a child seat-vehicle safety system for a passenger vehicle, including at least one child seat buckle signaling device, which includes a buckling detector, and a buckling detector for signaling the buckle status, and a portable controller device that attaches to the On-Board Diagnostic II (OBD-II) port of the vehicle, for detecting the status of the vehicle ignition system, receiving the buckle status signal, and generating an alarm signal in response to a predetermined condition of the ignition status and the buckle status signal. The portable controller device also can include an alarm that is responsive to the alarm signal. The invention includes a method of warning a vehicle operator that a child has been left buckled in a vehicle after the vehicle's ignition system has been turned off, including detecting the vehicle ignition status selected from "on" and "off" through the OBD-II port, receiving a buckle status signal transmitted from the child seat buckle signaling device, and generating an alarm signal when the ignition status is "off" and the buckle status signal is 'buckled' beyond a predetermined grace or timeout period. However, this system's reliance on OBD-II makes the system inoperable for any vehicles pre-1996.

U.S. Patent Publication 20130106598 to Silveira discloses a portable vehicle alarm system alerts a vehicle operator of the presence of a child/pet left in the vehicle. The system includes at least one first portable wireless alarm unit in communication with a second portable wireless unit. The first and second portable wireless alarm units include a microprocessor in communication with a transmitter and receiver, having a power supply. The first portable unit is located on a key chain. The second wireless unit has attachment means for attachment to a seat belt associated with a child's car seat or a pet's collar. An activation sensor detects a disengagement action related to the vehicle, including powering-off of the vehicle ignition or unbuckling of the driver's seat belt. A distance sensor has a selected range. If the range is exceeded, an audible alarm is actuated from the first unit. However, this system requires modification to the vehicle to use the alarm. This modification can be costly. The invention also requires the driver to power off the vehicle or unbuckle the seat, requiring additional wiring that can malfunction. Lastly, the invention does not utilize the existing seat belt of the car seat, but instead uses a clip that attaches to the seat belt that can easily be lost in the back seat of a car or destroyed by the child.

U.S. Patent Publication 20090079557 to Miner discloses a wireless, self-activating, proximity warning system utilizes an on-board computer of an automobile and a GPS locating system to sending a warning signal to a vehicle operator that a child has been left buckled and unattended in an infant seat. A transmitter associated with the child seat transmits coded RF signals of certain strength to a receiver carried by the operator. The receiver triggers an alarm when the signal strength or time between transmitted signals indicates that the operator has gone beyond a permitted range. However, this system requires modification to the vehicle to use the alarm. As mentioned above, this modification can be costly. The system also requires the use of an existing GPS system or on-board computer of the car that not all vehicles are equipped with. Lastly, the invention does not utilize the existing seat belt of the car seat, but instead uses a chest strap. Chest straps for car seats are typically more flimsy than the buckle, which could lead to breakage of any inserted electrical components over time, and are more suspect to the child unsecuring the connection, thus deactivating the alarm system. Finally, the chest strap is in a more central location for liquid spills to come in contact with the electrical components.

U.S. Pat. No. 8,659,414 to Schuk discloses a wireless child proximity monitoring and alarm system for use with child seats for vehicles includes a separable seat monitor for affixation to the seat's shoulder straps. The seat monitor has a first housing affixable to one of the shoulder straps and a second housing affixable to a second shoulder strap. The second housing has a transceiver for wireless communication and a microcontroller integrated with the transceiver. A micro switch is communicative with the microcontroller and is responsive to the proximity of the first housing. A connecting strap extends between the housings and is separable from at least one housing. A key fob for retention by a child caregiver has a fob case and a transceiver therein for wireless communication with the seat monitor transceiver. A microcontroller is integrated with the transceiver, and an alarm is selectively operable between a first silent state and a second audible alarm generating state. However, this system uses only the chest straps to trigger the alarm and places all electronic components in the chest strap. As explained above, the use of the chest strap for the electronic components can be problematic.

U.S. Pat. No. 8,451,110 to Takeshita discloses a seat belt warning apparatus capable of stopping the operation of a buzzer, for example, when a passenger has moved from a rear seat to another seat, such as a front passenger's seat, and fastens the seat belt, the seat belt warning apparatus outputs a notice when the number of seats where seat belts are fastened except a driver's seat is reduced, and stops the output of the notice when the number of seats where the seat belts are fastened except the driver's seat is equal to or more than that when the notice is output. However, this system requires modification of the vehicle for use and only alerts if the passenger changes seats during the trip.

U.S. Pat. No. 8,378,801 to Freeman et al. discloses a system for determining abandonment of a child or infant in a vehicle. The system features a remote key in communication with sensors operatively connected to seatbelts in a vehicle. If a user presses the lock button on the remote key the sensors determine if any seatbelt has been left engaged. If a seatbelt is engaged an alarm is activated on the remote key. If no seatbelt is left engaged, the vehicle doors become locked. To override the alarm, and override button must be pushed on the remote key. An unlock button on the remote key unlocks the vehicle doors and the system is reset. However, this system only check if a child is buckled in the vehicle if the driver attempts to lock the doors, not when the driver leaves the vehicle.

U.S. Pat. No. 8,289,145 to Miller et al. discloses a wireless seatbelt monitoring system and method is provided for informing a driver that a seatbelt that should be latched is unlatched. The system includes a wireless seatbelt assembly having a buckle equipped with a piezoelectric element and a transmitter. The transmitter sends a wireless seatbelt status signal when the seatbelt assembly is buckled by harvesting energy during the insertion process. The wireless seatbelt status signal is transmitted to a dedicated repeater module, which retransmits the wireless seatbelt status signal to a receiver. Based upon the wireless seatbelt status signal, the system informs the driver of the status of the seatbelt assemblies audibly, visually, or both. However, this system requires modification to the vehicle to use the alarm. Further, the system does not monitor the location of the driver and merely focuses on whether the seat belt is latched.

U.S. Pat. No. 8,217,796 to Trummer discloses an alarm and monitoring system for the attachment of safety harnesses and temperature readings for respective child seat occupants within the car. The monitoring component details the attached "status" of said harnesses through indicator lights on the main operator dashboard along with on the system device. Alarm features automatically warn either the driver or surrounding bystanders or emergency personnel of alarm situation including temperature variances, harness disengagement, accident or unattended occupant warnings. The Child Seat Safety System can reduce the risk of small children being injured due to unattached seat belts during accident, braking or collision, and can reduce exposure to unhealthy temperatures either during driving or from extended lengths of time being unattended in a car. However, this alarm focuses only on whether the occupant is buckled, not whether the driver is in the car with the occupant.

U.S. Pat. No. 8,125,343 to Denale discloses a system for child safety relating to a child safety seat that is in communication with the internal wiring or computer system of a vehicle such that when the vehicle ignition is turned off and the child safety seat is engaged, an audible alert is emitted through the vehicle speakers. However, this system requires modification to the vehicle to work as well as the use of a newer vehicle with a computer system and speakers.

U.S. Pat. No. 8,120,499 to Ortiz discloses a warning system that utilizes a belt like device comprised of two sections connected together with magnets. The free ends of the two sections can be equipped with clips for securing each section to either child or caregiver. When the caregiver gets out of the vehicle the magnets and their respective sections separate, and a tune, tone, song, or some other audible signal is played through a speaker on the device. The audible signal could be activated by the use of a magnetic sensor or magnetic switch. The audible signal would alert and remind the caregiver that a child is still in the vehicle. However, this disclosure requires the use of a specific belt that can be easily overlooked.

U.S. Pat. No. 8,063,788 to Morningstar discloses a warning system for notifying another person when a child is left in a child safety seat. The system recognizes a child in a child safety seat by either a pressure pad or a secured child seat lap belt. The system is activated by the release of the driver's seat belt. Should a child remain in the seat when the driver's seat belt is disengaged, the system alarms notifying the driver of such. The alarm would include a calm audio output such as a lullaby, a song, or a story. The system can be integrated into the OEM features to provide an alert escalation process using a local alert, a vehicle alert, a wireless alert and ultimately a 911 alert. However, the system requires a vehicle with OnStar® or similar device. Additionally, the system relies upon the activation of the driver's seat belt, which may not always be utilized.

U.S. Pat. No. 7,733,228 to Lee discloses a wireless system that detects the presence of a child in a safety seat located in the passenger cabin of a vehicle includes a controller responsive to signals generated by sensors monitoring predefined functions of the vehicle, RFID tag device attached to the safety seat and RFID tag reader mounted in the cabin. The system generates control signals which activate an alarm, open the doors of the vehicle and roll down windows if the child is left in the safety seat of an unattended vehicle. However, this system requires modification to the vehicle to use the alarm, requires the presence of a RFID reader which can be costly, and relies upon a pressure sensor pad in the car seat to detect the presence of the child, which creates a potential issue with the sensor as it can be dislodged during use, thus deactivating the alarm. Lastly, the system requires that the vehicle be equipped with automatic doors and windows for use.

U.S. Pat. No. 7,714,737 to Morningstar discloses a warning system for notifying another person when a child is left in a child safety seat. The system recognizes a child in a child safety seat by either a pressure pad or a secured child seat lap belt. The system is activated by the release of the driver's seat belt. Should a child remain in the seat when the driver's seat belt is disengaged, the system alarms notifying the driver of such. The alarm would include a calm audio output such as a lullaby, a song, or a story. The system can be integrated into the OEM features to provide an alert escalation process using a local alert, a vehicle alert, a wireless alert and ultimately a 911 alert. However, the system requires a vehicle with OnStar® or similar device. Additionally, the system relies upon the activation of the driver's seat belt, which may not always be utilized.

U.S. Pat. No. 7,466,217 to Johnson discloses a system for signaling that a person is in an vehicle is provided and includes a power source, a processing unit including a counter, a state monitoring unit configured to monitor an internal temperature of the vehicle and to monitor whether the vehicle is in an off state and a door monitoring unit configured to monitor whether any of the vehicle doors are open or closed, a first buckle receiver, including a first signal issuing unit, a first buckle to be removably inserted into the buckle receiver and to thereby cause the first signal issuing unit to issue an installation signal to the processing unit, a second buckle receiver, including a second signal issuing unit, a second buckle to be removably inserted into the second buckle receiver and to thereby cause the second signal issuing unit to issue an occupation signal to the processing unit, and an alarm unit. However, this system requires modification to the vehicle to use the alarm and requires the use of the car ignition to activate the alarm. The alarm also does not measure the distance of the driver from the vehicle.

U.S. Pat. No. 7,391,310 to Ito discloses a seatbelt alarm device for a vehicle includes a seat sensor, a seatbelt sensor, a judgment circuit, an alarm unit, and a child seat sensor. The seat sensor detects a mass on a seat of the vehicle. The seatbelt sensor detects whether a seatbelt of the seat is engaged with a seatbelt buckle. The judgment circuit generates a demand for a seatbelt-wear alarm upon determining that a mass sits on the seat and the seatbelt is not engaged according to detection signals of the seat sensor and the seatbelt sensor, respectively. The alarm unit generates the seatbelt-wear alarm. The child seat sensor detects a child seat mounted on the seat. The judgment circuit restricts operation of the alarm unit when the judgment circuit determines that the child seat is mounted to the seat according to a detection signal of the child seat sensor. However, this system requires modification to the vehicle to use the alarm and requires a pressure sensitive pad in the driver's seat to activate, adding more costly modifications to the vehicle.

U.S. Pat. No. 7,378,979 to Rams discloses a system for detecting the presence of a child in a car, when the driver exits the vehicle. A sensor is connected to the seat belt of the baby's car seat or to the rear seat belts. Once the seat belt is inserted into the belt buckle, an alarm circuit is activated. When the driver enters the vehicle and sits down, the system detects the presence of the driver and de-activates the alarm circuit. When the driver exits, the alarm circuit is then re-activated. The system includes a delay timer that gives the driver time to enter and exit the vehicle without setting off the alarm circuit. When the alarm circuit is activated, a timer for the time delay begins. At the end of the time delay (e.g., relay is transferred), if the driver has not disabled the alarm circuit by re-entering the vehicle or taking the child out of the vehicle, the alarm circuit will be set off warning signals and will remain energized until disabled. However, this system requires modification to the vehicle to use the alarm and requires a pressure sensitive pad in the driver's seat to activate, adding more costly modifications to the vehicle.

U.S. Pat. No. 7,321,306 to Lee et al. discloses a wireless system that detects the presence of a child in a safety seat located in the passenger cabin of a vehicle includes a controller responsive to signals generated by sensors monitoring predefined functions of the vehicle, RFID tag device attached to the safety seat and RFID tag reader mounted in the cabin. The system generates control signals which activate an alarm, open the doors of the vehicle and roll down windows if the child is left in the safety seat of an unattended vehicle. However, this system requires modification to the vehicle to use the alarm, requires the presence of a RFID reader which can be costly, and relies upon a pressure sensor pad in the car seat to detect the presence of the child, which creates a potential issue with the sensor as it can be dislodged during use, thus deactivating the alarm. Lastly, the system requires that the vehicle be equipped with automatic doors and windows for use.

U.S. Pat. No. 7,224,270 to Patterson et al. discloses a child seat adapted for use in a vehicle, the child seat comprising: a shell portion; a harness for securing a child to the child seat, the harness comprising adjustable harness tether(s) secured to the shell portion at one end and having a latch plate at the other, the latch plate being configured to releasably engage a buckle of the harness; a tension sensor(s) for providing a signal indicative of a tension of the adjustable harness tether(s); and an electronic control unit secured to the shell portion, the electronic control unit being operably coupled to the tension sensor(s) to receive the signal, the electronic control unit being capable of processing the signal to compare the signal to a signal indicative of a predetermined range of acceptable tension, wherein the electronic control unit provides an output indicating whether the tension of the adjustable harness tether(s) is(are) within the predetermined range. However, this disclosure merely determines if the child safety harness is properly secured and does not determine the position of the driver in relation to the car seat.

U.S. Pat. No. 7,106,207 to Marchan discloses an alarm which includes a pressure-actuated sensor positional beneath the seat liner of a vehicle child seat. The sensor includes a plastic enclosure positioned thereabout for shielding the sensor from foreign elements. A speaker is coupled to the sensor and is attachable to an outer surface of the child seat. A push button switch is coupled to the sensor and the speaker, and is attachable to a vehicle door. The switch includes a female receptacle and a male plug mateable therewith. The receptacle and plug communicate with the sensor. The sensor generates and transmits a signal when a threshold weight is detected and the vehicle door is ajar. The speaker receives the signal and emits an audible signal and continues to emit the signal until at least one sensor and push bottom switch are reset. A power source is coupled to the speaker. However, this disclosure requires modification to the vehicle to use the alarm. As mentioned above, this modification can be costly. Specifically with this disclosure, the modification entails door wiring modifications. The alarm relies upon a sensor within the car seat, which creates a potential issue with the sensor as it can be dislodged during use, thus deactivating the alarm. Lastly, the alarm relies upon speakers on the child seat, rather than a speaker on the driver through a fob or personal electronic device.

U.S. Pat. No. 6,998,988 to Kalce discloses an infant alarm system for automobiles for alarming when the driver seat is unoccupied has a pressure sensor pad for detecting the presence of a person in a car seat. A belt buckle switch is for determining whether a belt buckle is buckled into an infant car seat. A control box is electrically connected to the pressure sensor pad and the belt buckle switch. The control box is for outputting an alarm signal when the belt buckle switch indicates that the belt buckle is buckled into the infant car seat and the pressure sensor pad does not detect the presence of the person in the car seat. However, this system requires modification to the vehicle to use the alarm. As mentioned above, this modification can be costly. Additionally, this system requires use of an on/off switch to activate and deactivate the alarm. This additional step can easily be overlooked during a busy morning, thus leaving the potential for the alarm system to be unarmed.

U.S. Pat. No. 6,924,742 to Mesina discloses a seat belt alarm system which activates an alarm when a child is buckled in a car seat and when the car key is removed from the ignition. The seat belt alarm system includes a belt buckle having a belt-buckled sensor and a transmitter that transmits a belt-buckled signal when the belt is buckled. A remote key module includes a key-removed sensor that senses when the key is not in a keyhole. The key module further includes a receiver and an alarm device that is activated when the key is not in the keyhole and the belt-buckled signal is received from the transmitter. In another variation, a controller is provided. The controller may be coupled to various components including the belt-buckled sensor, a key-removed sensor, a transmitter and additional devices such as a horn, air conditioning, etc. The controller instructs the transmitter to send an activate-alarm signal to a receiver in the key module when a belt-buckled signal and a key-removed signal are input to the controller. The alarm device may provide a sound, vibration, light, or another indicator. Another variation includes a removable baby seat with a seat belt alarm system. Still another variation includes an automobile having a seat belt alarm system. However, this unit requires modification to the vehicle to use the alarm and requires the car ignition to activate. Lastly, the alarm system requires a pressure sensitive pad in the driver's seat to activate, adding more modification to the vehicle.

U.S. Pat. No. 6,909,365 to Toles discloses a child safety seat with a safety seat unit. An alarm unit is coupled to the safety seat unit. The alarm unit sounds an alarm to remind occupants of the vehicle when a child is sitting in the child safety seat after the ignition of the vehicle in which the child safety seat is installed is turned off. However, this unit requires modification to the vehicle to use the alarm and requires the car ignition to activate. Further, a specialized key is required to use the alarm, thus increasing the costs associated with this alarm. The alarm is located in the chest strap, which as explained above, can be problematic in the long-term effectiveness of the alarm. And lastly, this invention does not monitor the location of the driver of the vehicle, but instead uses a timeout function.

U.S. Pat. No. 6,812,844 to Burgess discloses a child seat with a built-in alarm that alerts if the door is opened. However, the constant alerting by Burgess's system—as the door will always be opened even if the parent hasn't forgotten the child—inefficiently drains the power supply of the alarm and also will unnecessarily wake a sleeping child.

U.S. Pat. No. 6,104,293 to Rossi discloses a warning system for detecting presence of the child in an infant seat that detects the state of the vehicle's ignition system. However, the Rossi '293 patent overly complicates the alarm system by not only detecting a child is present, but also detecting whether the vehicle is still operating. This complicated dual detection system allows for potential failure of the system.

Furthermore, U.S. Pat. No. 6,028,509 to Rice discloses a voice-activated vehicle alarm system that generates an output signal in response to signals from a temperature sensor and a sound detector. However, the Rice '509 patent lacks the ability to sound an alarm until a potentially dangerous temperature has already been reached inside of the vehicle.

Similarly, U.S. Pat. No. 5,966,070 to Thornton discloses a child alert alarm for automobiles that detects the presence of a child locked within a parked automobile during extreme temperatures. However, the Thornton '070 patent cannot sound an alarm until a potentially dangerous temperature has already been reached inside of the vehicle.

U.S. Pat. No. 5,793,291 to Thornton discloses a child alert system for automobiles. However, the Thornton '291 patent has a significant drawback of not sounding an alarm until a potentially dangerous temperature has already been reached inside of the vehicle.

In addition, U.S. Pat. No. 5,581,234 to Emery et al. discloses an infant vehicle seat alarm system that produces an audible or visual warning when the seat/carrier component is initially aligned on the base component, not locked onto the base component, or when the harness is in an unused state. However, the Emery et al. '234 patent does not alert the driver to the presence of an infant when the driver is away from the vehicle.

Lastly, U.S. Pat. No. Des. 306,099 to Kassai discloses a child's safety seat for an automobile. However, the Kassai '099 patent does not generate an alarm when the driver is away from the vehicle.

While the above-described devices fulfill their respective, particular objectives and requirements, the aforementioned patents do not describe a child safety seat with alarm that allows notifying the driver of the vehicle that an infant is in its carrier inside of the vehicle when the driver steps away from the vehicle.

Therefore, there is a need for a child safety alarm system which will work with all vehicles, including those without sophisticated computer & GPS systems.

There is a need for an alarm system that is integrated with the car seat to avoid loss of components near young children. Any parent is aware of the risk of a child swallowing or chewing on items. Likewise, as children grow, they are more inquisitive and manipulative of their environment. Older siblings are able to move components without their parent's knowledge, thus potentially destroying the alarm system if they remove and lose components.

There is a need for an alarm system that is integrated with the buckle of the car seat. Many of the inventions disclosed previously utilize the chest strap of the car seat. Chest straps for car seats are typically more flimsy than the buckle, which could lead to breakage of any inserted electrical components over time, and are more suspect to the child unsecuring the connection, thus deactivating the alarm system. Finally, the chest strap is in a more central location for liquid spills to come in contact with the electrical components. Other inventions rely upon a weight sensor on the car seat that can become dislodged and not respond to the presence of a child.

There is a need for an alarm system that travels with the driver if the driver leaves the vehicle. Some of the disclosures rely upon the alarm system of the car or on the car seat itself. When a driver is a way from the vehicle, relying upon alarms within the vehicle are not effective ways of alerting the driver. Therefore there is a need for an alarm that is a close personal effect of the driver.

There is a need for an alarm system that monitors the location of the driver rather than utilizing preset timeout functions to remind the driver of the potential occupancy of the vehicle. Timeout functions can be disregarded by the driver if they are instituted to quickly after shutting off the ignition. Drivers of tiny humans can become distracted by gathering paraphernalia from the car and still forget the important cargo within. Therefore, there is a need to tie the alarm system to the driver's proximity to the car rather than the ignition.

There is a need for an alarm system that activates immediately upon connection of the buckle of the car seat. Some previous disclosures require the parent to arm the alarm system, but this step can be overlooked easily, leaving the alarm system unarmed.

Therefore, a need exists for a new and improved child safety seat with alarm that can be used for notifying the driver of the vehicle that an infant is in its carrier inside of the vehicle when the driver steps away from the vehicle. In this regard, the present invention substantially fulfills this need. In this respect, the child safety seat with alarm according to the present invention substantially departs from the conventional concepts and designs of the prior art, and in doing so provides an apparatus primarily developed for the purpose of notifying the driver of the vehicle that an infant is in its carrier inside of the vehicle when the driver moves away from the vehicle.

SUMMARY OF THE INVENTION

In view of the foregoing disadvantages inherent in the known types of child alert systems for automobiles now present in the prior art, the present invention provides an improved child safety seat with a remote alarm system secured to the vehicle key, and overcomes the above-mentioned disadvantages and drawbacks of the prior art. As such, the general purpose of the present invention, which will be described subsequently in greater detail, is to provide a new and improved child safety seat with alarm which has all the advantages of the prior art mentioned heretofore and many novel features that result in a child safety seat with alarm which is not anticipated, rendered obvious, suggested, or even implied by the prior art, either alone or in any combination thereof.

To attain this, the present invention essentially comprises a child safety seat having a buckle which requires a latching pin from a latching housing to be inserted within the buckle to fully latch. When released from the housing, the latching pin broadcasts a signal to the housing while the housing is in range. Once the housing moves out of the range of the latching pin, the housing alerts to remind the parent that there is a child latched in the seat and outside of the range of the parent.

The invention may also include a speaker and lights comprising the alarm. The power source may consist of one single or multiple batteries. A device to monitor the status of the power source and alert the user of a problem with the power source may be employed. The switch may be attached to the buckle to monitor the closure status of the buckle. The power source may be contained within a battery compartment having a hingedly attached lid. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved child safety seat with alarm that has all of the advantages of the prior art child alert systems for automobiles and none of the disadvantages.

It is another object of the present invention to provide a new and improved child safety seat with alarm that may be easily and efficiently manufactured and marketed.

An even further object of the present invention is to provide a new and improved child safety seat with alarm that has a low cost of manufacture with regard to both materials and labor, and which accordingly is then susceptible of low prices of sale to the consuming public, thereby making such child safety seat with alarm economically available to the buying public.

Still another object of the present invention is to provide a new child safety seat with alarm that provides in the apparatuses and methods of the prior art some of the advantages thereof, while simultaneously overcoming some of the disadvantages normally associated therewith.

Even still another object of the present invention is to provide a child safety seat with alarm for notifying the driver of the vehicle that an infant is in its carrier inside of the vehicle when the driver moves a distance away from the carrier.

A further object of the present invention is to provide a child safety seat with alarm for notifying the driver of the vehicle that an infant is in its carrier through both audible and visual alerts within the driver's presence.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views:

FIG. 6 is an exploded view thereof;

FIG. 9 is a front elevational view of the buckle component;

FIG. 10 is a bottom plan view thereof;

FIG. 11 is right side elevational view thereof;

FIG. 12 is a perspective view thereof;

FIG. 13 is an exploded view thereof;

FIG. 29 is a screenshot of the portable computing device in accordance with the described embodiments;

FIG. 30 is a screenshot of the portable computing device in accordance with the described embodiments;

FIG. 33 is a screenshot of the portable computing device in accordance with the described embodiments;

FIG. 34 is a screenshot of the portable computing device in accordance with the described embodiments.

DETAILED DESCRIPTION OF THE INVENTION

Figure 1:
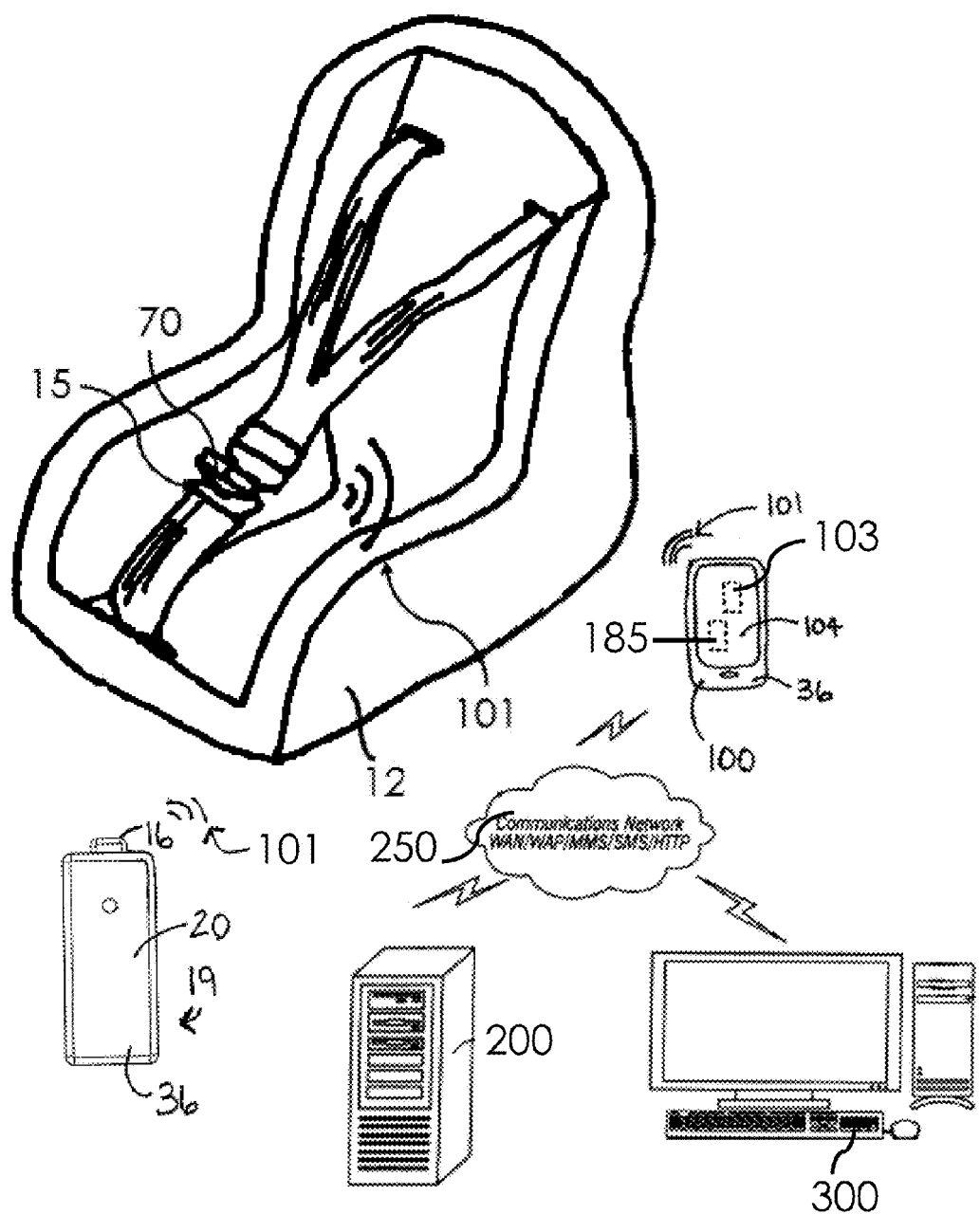
FIG. 1 is an environmental view of our invention with the housing and latching pin inserted in the child seat buckle.
Figure 3:
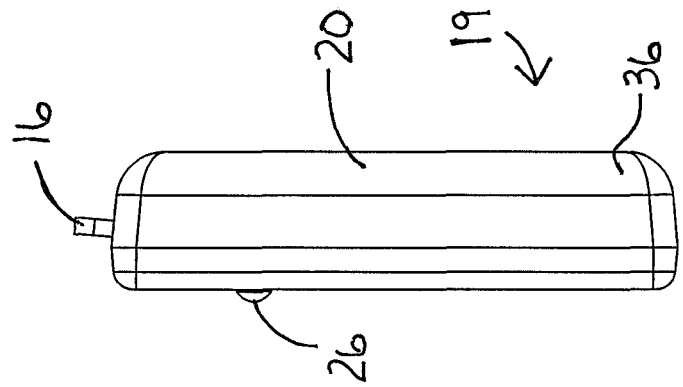
FIG. 3 is a right side elevational view of the same, the left side being a mirror image.
Figure 2:
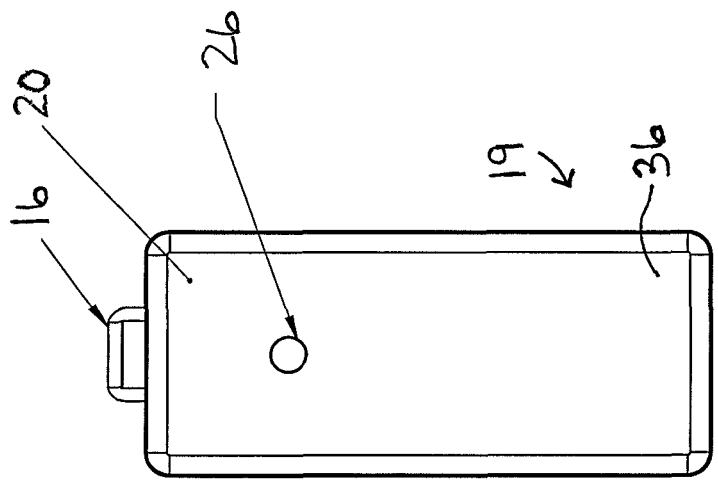
FIG. 2 is a top plan view of the alarm system.
Figure 5:
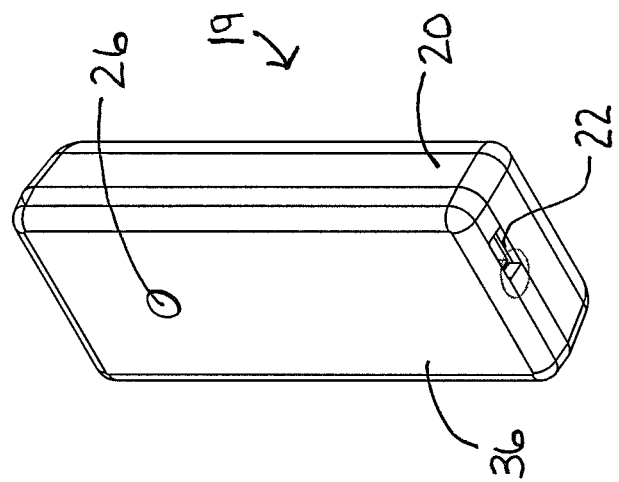
FIG. 5 is perspective view thereof.
Figure 4:
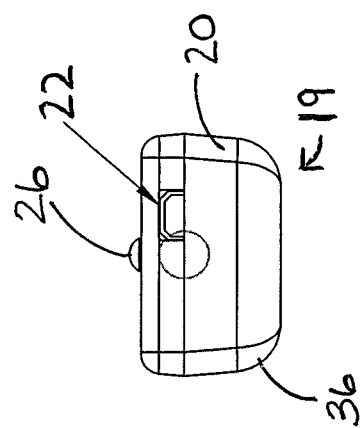
FIG. 4 is a back elevational view of the same.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Certain terms are defined below to facilitate understanding of exemplary embodiments. To the extent a term used in a claim is not defined below, it should be given the broadest definition persons in the pertinent art have given that term as reflected in printed publications and issued patents.

As used herein, the term "application" refers generally to a computer program that operates on a computer system, e.g., but not limited to, a computer program operated within a cellphone or mobile device (a mobile application). Further examples of applications include programs that perform a search in a database, receive and store information in a temporary memory of a mobile device, display selected information on a mobile device, etc., and virtually any other type of program that generates transactions or is responsive to transactions.

As used herein, the term "button" means a hard-button, icon, or other object that when clicked results in an action.

As used herein, the term "communications network" is to be interpreted broadly and includes, but is not limited to, local area networks, telecommunications networks, wide area networks, modem connections, etc. Typically, a communications network will comprise a physical component or physical connection that is made up of the wiring, interface cards and other hardware combined with a specified communications protocol to transmit information from one physical connection to another.

As used herein, the term "microcontroller" means a controller on a single integrated circuit containing a processor core, memory, and programmable input/output peripherals.

As used herein, the term "portable electronic device" is any device having a processor, memory, and an operating system, capable of interaction with a user or other computer and which can be used for communication over a wireless communication networks, such as a cellular phone, a walkie-talkie, a personal digital assistant (PDA), a pager, a smart phone, or any combination thereof. Portable electronic devices operative in the present invention typically run a mobile software application to affect the functionality described herein.

As used herein, the term "SMS" means short message service, a text communication service available on many digital mobile devices or phones that permits the sending of short messages (also known as text messages, messages, or more colloquially SMSes, texts or even txts) between mobile devices or phones.

As used herein, the terms "wireless communication" and "wirelessly communicate" generally refers to a transmission of communication signals, such as voice signals and/or data signals, between devices. For example, as described herein, a transceiver, may wirelessly communicate with a portable electronic device. In addition, as used herein, the term "wireless communication protocol" refers generally to a communications protocol that facilitates transmitting and receiving communications signals over a wireless connection. Examples of wireless communication protocols include Bluetooth®, Wi-Fi, and ZigBee® (Bluetooth® is a registered trademark of Bluetooth SIG, Inc., Bellevue, Wash., USA, and ZigBee® is a registered trademark of ZigBee Alliance Corporation, San Ramon, Calif., USA). However, various embodiments of the invention may utilize alternative protocols.

Referring now to the drawings, and particularly to FIG. 1, a current embodiment of the child safety seat with alarm of the present invention is shown and generally designated by the reference numeral 10.

In FIG. 1, a new and improved child safety seat with alarm system or alert system 10 of the present invention for monitoring the occupancy of a child safety seat and notifying the driver of the vehicle that a child is in its seat inside of the vehicle when the driver moves a distance away from the seat is illustrated and will be described. More particularly, the child safety seat with alarm system 10 has a child safety seat 12 in place on a vehicle seat.

In one embodiment shown in FIG. 1, the alarm system 10 has two separate components, the first being the buckle component 34 which may be secured within the buckle system 15 of the child safety seat and the second being the driver component 36 that is personal to the driver and stays with the driver. The alarm system 10 is engaged when the female end 18 of the lap buckle system 15 receives the male end buckle 14 or when the driver activates the system 10 from the driver component 36. It is envisioned that the alarm system 10 may be engaged by a pressure sensor or switch 51 (shown in FIG. 8) within the buckle system 10 or electronic circuit 60 located within female end of the buckle system 10 that activates when a corresponding circuit on the opposing male end is matched to it. The alarm system 10 is placed within the lap buckle system as the lap buckle 15 is more robust than the chest buckle of most car seats, allowing the electronic components of the system 10 to be better insulated from exterior pressure on the unit and from liquid spills. Additionally, children can more easily disengage the chest buckle, thus disengaging the alarm.

The buckle component 34 is shown in more detail in FIG. 1. As shown in FIG. 1 in one embodiment, the buckle 14 for a child safety seat is shown in a closed position. In order for the alarm system 10 to engage, the buckle 14 must latch fully. As will be discussed more fully below, once the male end is inserted in the latch of the buckle 14, a sensor 51 is activated within the female end 18 that instructs a transceiver 70 (shown in detail in FIG. 13) within the buckle component 34 to broadcast a wireless signal 101 for reception by the driver component 36. The transceiver 70 can include an antenna for radio transmission as well. The wireless communications can be based on many different wireless communication protocols. The transceiver 70 may additionally be configured with GPS technology to allow for positioning of the device 10. The buckle component 34 may include one or more transceivers 70 which individually can communicate with a different driver component 36.

The driver component 36 may be a portable device 19 or a portable electronic device 100. A portable device 19 capable of receiving the wireless communication from the transceiver 70 (or vice versa) is shown in more detail in FIGS. 2-6. The transceiver 70 (shown in FIG. 13) can broadcast to a receiver 27 integrated with a microcontroller 28 and contained within the driver component 36, which can be a portable device 19 or a portable electronic device 100 (shown in FIG. 1). The portable device 19 has a housing 20 and is generally fashioned to be a small device, such as a key fob, to allow for the housing 20 to be secured to a key ring (not shown) at a connection port 16. As shown in the figures, portable device is depicted as a key fob. However, it is envisioned that the portable device can be other small personal objects, such as jewelry, purses, or wallets.

The portable device 19 may be coupled to the ignition key or personal effects of the driver such that if the ignition key or the driver is removed from the vehicle after the vehicle is turned off, the portable device 19 is also removed from the vehicle. The housing 20 of the portable device 19 includes a port 22 for charging the power supply 24 contained within the housing 20 and a LED light 26 or similar signal light connected to the receiver 27 and processor contained within the housing 20. The light 26 is configured to receive power and remain lit while the receiver 27 receives the broadcasted wireless signal. The housing 20 may additionally contain a transceiver configured to broadcast a signal 101. A speaker 30 is additionally contained within the housing 20 and is connected to the transceiver or receiver.

The transceiver 70 of the buckle component 34 may be initialized 500 to a portable electronic device 100, such as a GPS capable cell phone, that is carried by the guardian of the child, rather than the portable device 19.

A portable electronic device 100 having a processor and a screen 104 for viewing images and video playing capabilities (e.g. video software, a video card and speakers for audio) is presented for use. The device 100, through the software and hardware disclosed herein, may communicate with a communications network 250 capable of transmitting data to a server 200 for further distribution to other users 300 via desktop computers or portable electronic devices 100. More specifically, FIG. 1 shows a top view of fully assembled portable electronic device 100. Portable electronic device 100 can process data. By way of example, portable electronic device 100 can generally correspond to a device that can perform as a camera, music player, game player, video player, personal digital assistant (PDA), tablet computer and/or the like. The portable electronic device 100 includes a mechanism for wireless communications, as either a transceiver type device or receiver only, such as a radio, portable computing device 100 can include an antenna that can be disposed internal to a radio transparent portion of the housing of the device 100. The wireless communications can be based on many different wireless protocols including for example 4G, 3G, 2G, Bluetooth, RF, 802.11, FM, AM, and so on. Any number of antennas may be used, which can use a single window or multiple windows depending on the needs of the system. In one embodiment, the system can include at least first and second antenna windows built into the housing.

The portable electronic device 100 may include an enabled location determining device, such as a Global Positioning System (GPS) device, a triangulation device, or through Wi-Fi assessment, for providing location information in the form of, for example, latitude and longitude values. The portable electronic device 100 may transmit, via a communications network 250, some or all of the received data to a central server 200, or similar network entity or mainframe computer system, which then communicates data to additional user selected devices 300. The portable electronic device 100 is configured through the use of the GPS capabilities of the device to validate the GPS location of the portable electronic device.

Figure 8:
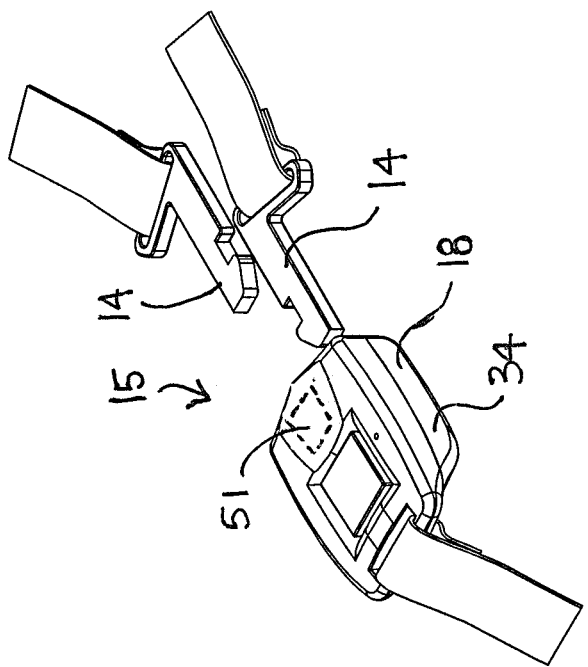
FIG. 8 is a perspective view thereof.
Figure 7:
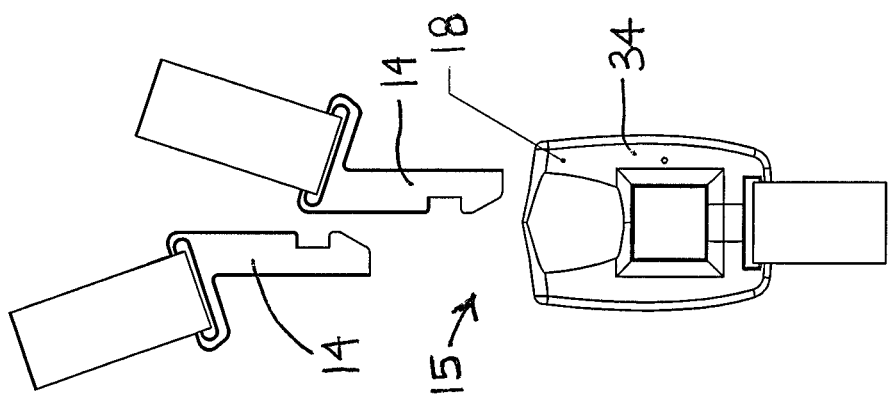
FIG. 7 is a front elevational view of the buckle.

As shown in FIGS. 7-8, the buckle system 15 includes a female end 18 which receives the male end buckle 14 to engage the alarm system 10 of FIG. 1. The buckle component 34 of the alarm system 10 may be enclosed in the buckle system or have a separate compartment 32 (as shown in FIGS. 9-13) in communicable arrangement with the buckle system 15. The interior components of the separate component 32 and the buckle component 34 are the same despite the housing. As shown in more detail in FIGS. 9-13, the buckle component 34 of the alarm system 10 is contained within a housing 38 with LED light ports 40 on the exterior to allow for indication lights of low battery or transmitter functions and a reset button 42 for the transceiver 70. The housing contains a processor, a transceiver 70 as discussed above, a power supply 44, LED lights or other light emitting bulbs for indication lights 46, 48. The exterior of the housing has attachment slots 52 communicable with back of the housing to allow for connection to the buckle port 50 and provide communication from a switch within the buckle 15 to the transceiver 70.

As discussed above, a single transceiver 70 of the buckle component 34 is configured to communicate with a single portable device 19 or portable electronic device 100. It is envisioned that a single portable device 19 or portable electronic device 100 could be configured to communicate to multiple buckle components 34 of other car seats in the same vehicle or in another vehicle through pairing of the buckle component 34 with the communication system of the portable device 19 or portable electronic device 100.

Figure 14:
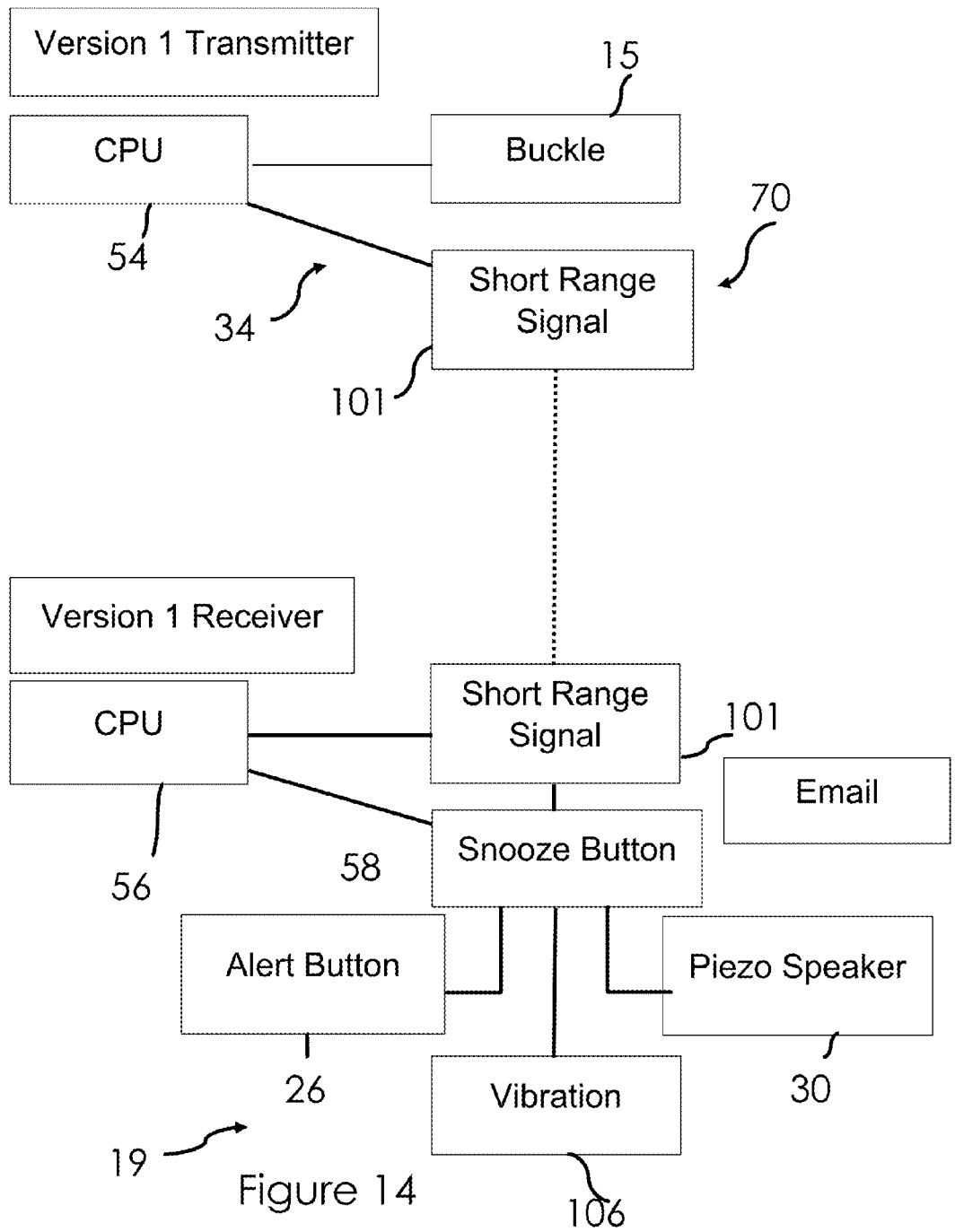
FIG. 14 is a block diagram corresponding to operations of the described embodiments of the present invention.
Figure 15:
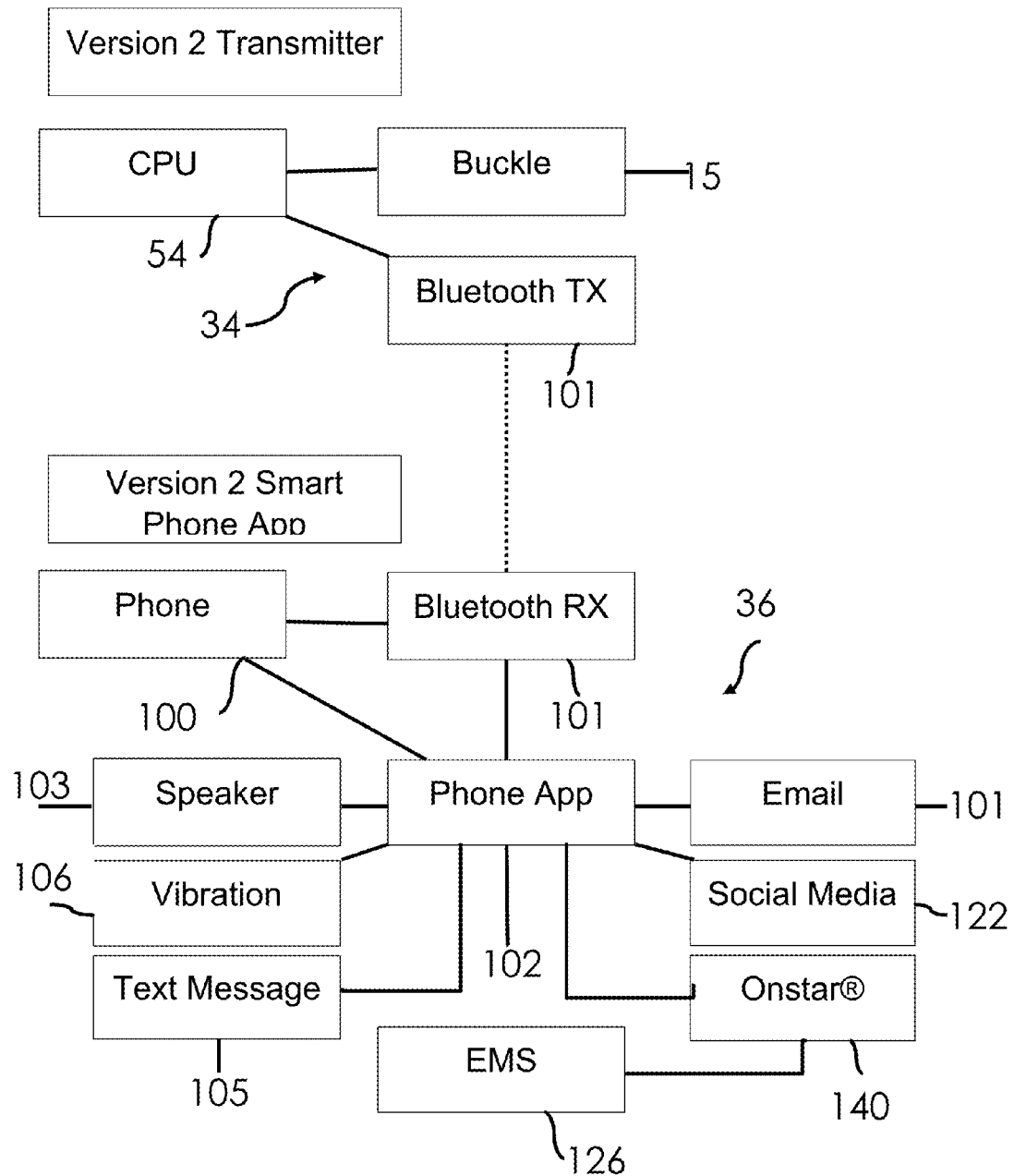
FIG. 15 is a block diagram corresponding to operations of the described embodiments of the present invention.
Figure 16:
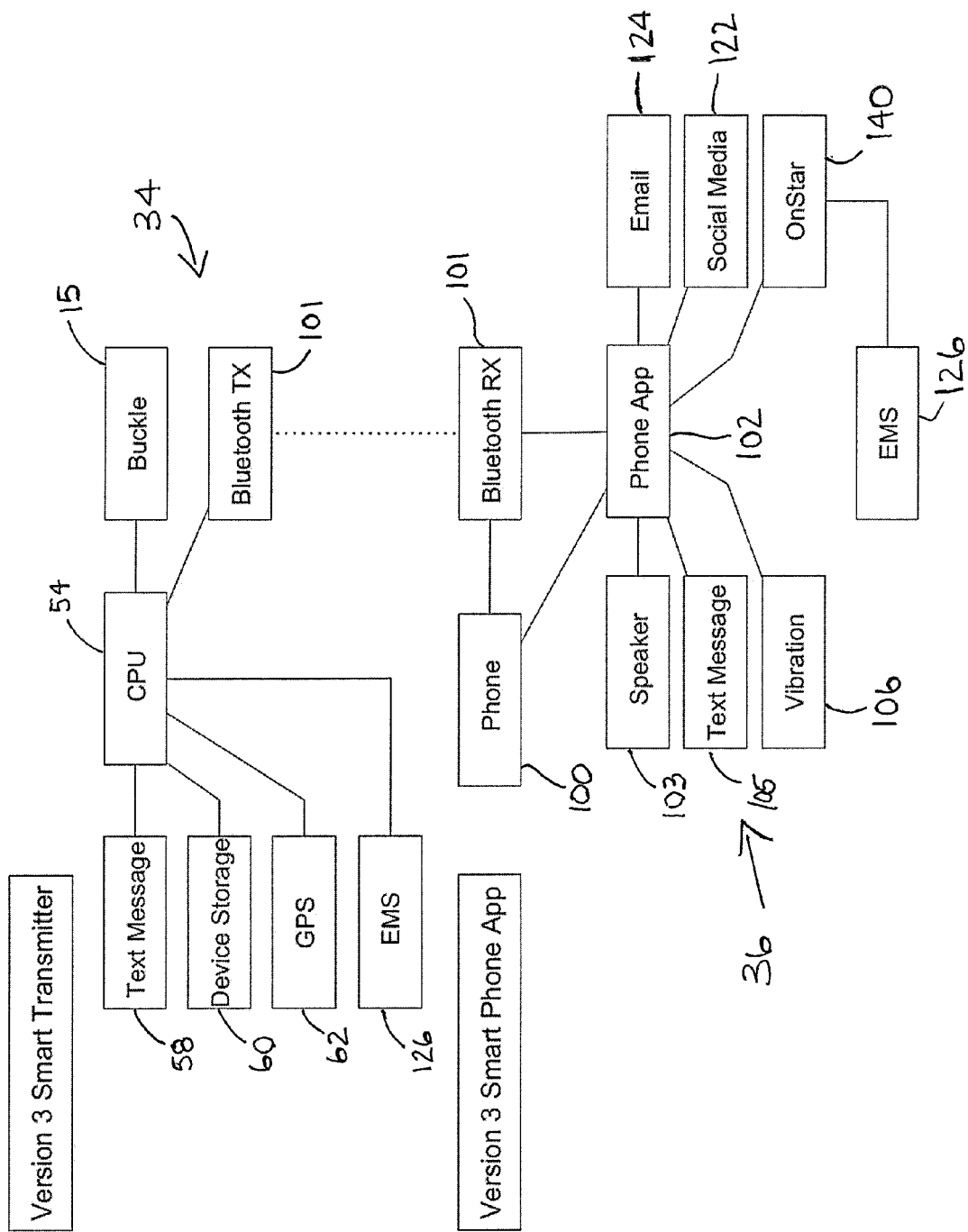
FIG. 16 is a block diagram corresponding to operations of the described embodiments of the present invention.

FIGS. 14-16 outline the communications between the components 34, 36 of the different embodiments of the system 10. As shown in FIG. 14, a block diagram of the buckle component 34 provides a transceiver 70 with a processor 54 in communicative arrangement with the buckle 15 capable of producing a short-range radio-frequency signal 101. When the buckle 15 is engaged, a switch is activated and communicates with the processor 54 to send a status code to transmit a signal 101. The signal 101 is received and read by a transceiver (not shown) and processor 56 contained within the portable device 19 driver component 36. If the portable device 19 is outside of a programmed distance range of the signal 101 being transmitted by the buckle component 34, then an alarm signal is activated by the processor by playing an auditory noise through the speaker 30 of the portable device 19. The portable device 19 can silence the alarm by activating a snooze button 58 on the device 19. Once the portable device 19 is again in range of the signal 101, the alarm deactivates. The portable device 19 additionally may alert a visual alarm through a light activation 26 on the device 19 or through a vibration alarm 106.

FIG. 15 outlines the communication between a Bluetooth-enabled buckle component 34 with a portable electronic device 100. When the buckle 15 is engaged, a switch is activated and communicates with the processor 54 and Bluetooth transmitter to transmit a signal 101. The signal 101 is received by a synced portable electronic device 100 capable of receiving Bluetooth signals. If the portable electronic device 100 is out of range of the signal 101 being transmitted by the buckle component 34, then an alarm is activated. The portable electronic device 100 is equipped with application software 102 with stored information that can be accessed by the software for alarm purposes. Within the application software 102, phone contacts and sound alerts are stored. When the alarm is activated, the speaker of the portable electronic device 100 can access pre-selected auditory noises for playback to alert that the portable electronic device 100 is out of range. The portable electronic device 100 may also vibrate 106 or transmit text messages (SMS) 105 to the portable electronic device 100 or to pre-selected contacts stored within the software 102 of the portable electronic device 100. The portable electronic device 100 may also access a wireless communications system 140, such as OnStar®, a social media network 122, such as Facebook® or Twitter®, or access an e-mail account 124 to communicate the alarm status based upon pre-set selections by the user of the portable electronic device 100. The portable electronic device 100 may additionally utilize the phone component of the portable electronic device 100 to contact emergency medical services (EMS) 126.

FIG. 16 outlines the communication between a Bluetooth-enabled buckle component 34 and processor 54 with a portable electronic device 100. When the buckle 15 is engaged, a switch is activated and communicates with the processor 54 and Bluetooth transmitter to transmit a signal 101. The signal 101 is received by a synced portable electronic device 100 capable of receiving Bluetooth signals. If the portable electronic device 100 moves out of range of the signal 101 being transmitted by the buckle component 34, then an alarm is activated. The system 10 allows for the portable electronic device 100 to be out of range when the buckle is first engaged, to allow for multiple users of the device. The system requires the portable electronic device 100 to engage the alarm as well as engage the buckle. In this manner, only the portable electronic device 100 that is located near the buckle at the time of engagement will be synced to the device 10. The portable electronic device 100 and the buckle processor 54 are equipped to alert that the device 100 is out of range. Additionally, the buckle processor 54 is equipped to alert when the buckle is engaged through text message 58 to contacts stored within the device storage 60. The text message 58 can provide a message alerting the contact that the buckle is engaged along with location information accessed from the GPS 62 of the buckle 15. Additionally, the buckle processor 54 is equipped to alert EMS if the device 100 is out range. Within the application software 102, phone contacts and sound alerts are stored. When the alarm is activated, the speaker of the portable electronic device 100 can access pre-selected auditory noises for playback to alert that the portable electronic device 100 is out of range. The portable electronic device 100 may also vibrate or transmit text messages 105 to the portable electronic device 100 or to pre-selected contacts stored within the software 102 of the portable electronic device 100. The portable electronic device 100 may also access a wireless communications system 140, such as OnStar®, a social media network 122, such as Facebook® or Twitter®, or access an e-mail account 124 to communicate the alarm status based upon pre-set selections by the user of the portable electronic device 100. The portable electronic device 100 may additionally utilize the phone component of the portable electronic device 100 to contact emergency medical services (EMS) 126.

As mentioned above, the portable electronic device may be equipped with software 102 that works to communicate alarm alerts. As shown in FIGS. 17-34, a software mobile application accessible by the portable electronic device 100 upon installation and activation of the software upon the portable electronic device 100. The software may utilize the Bluetooth capabilities of the portable electronic device 100 and therefore, the pairing of the portable electronic device 100 and the buckle component 34 must be done before use of the software 102. As shown previously in FIG. 1, the device 100 through the software may communicate with a communications network 250 capable of transmitting data to a server 200 for further distribution to other users 300 via desktop computers or portable electronic devices 100.

Figure 18:
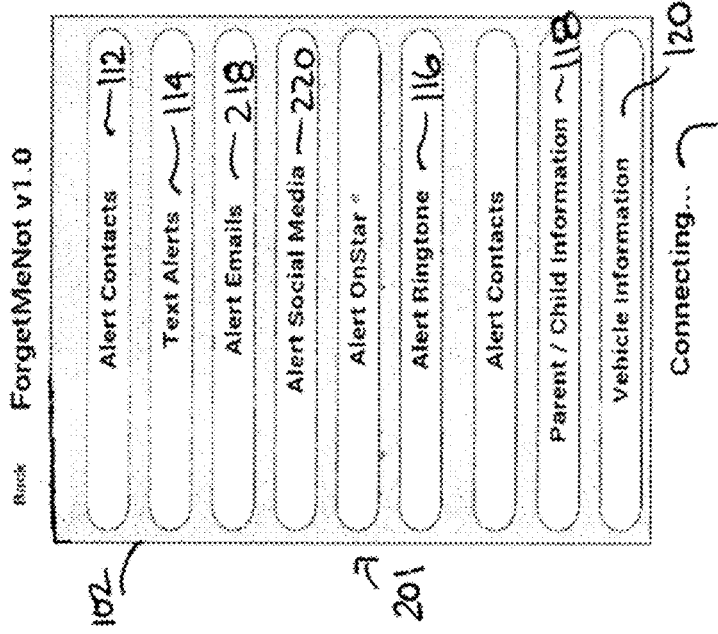
FIG. 18 is a screenshot of the portable computing device in accordance with the described embodiments.
Figure 17:
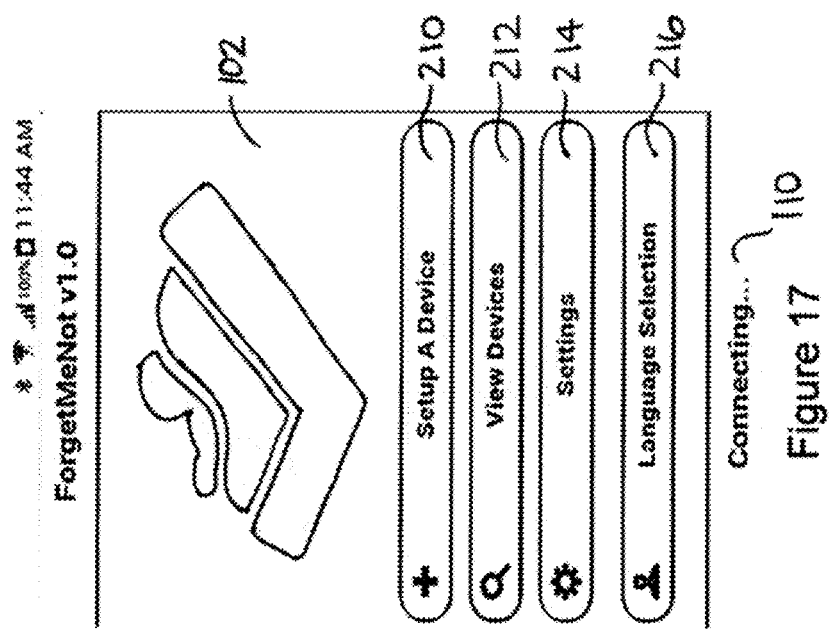
FIG. 17 is a screenshot of the portable computing device in accordance with the described embodiments.
Figure 20:
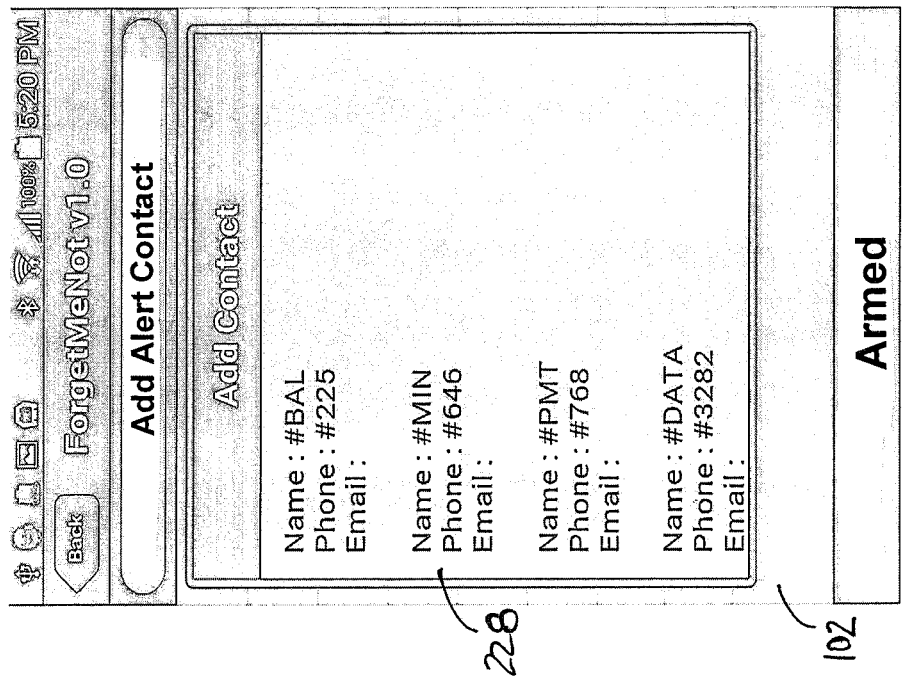
FIG. 20 is a screenshot of the portable computing device in accordance with the described embodiments.

As shown in FIG. 17, the application software 102 initially allows for the setup of the device 10 through accessing the SETUP button 210 and allows the user to view the devices 10 that are synced to the portable electronic device 100 through accessing the VIEW DEVICES button 212. The application software 102 additionally features a notification bar 110 to alert the user of the status of the device 100 through a selection of notifications including armed, unarmed, connecting or initializing. This notification bar 110 can be viewed across the application 102 in every screen. The user may modify settings for the application software 102 to configure specific alerts through accessing the SETTINGS button 214 and the user may modify the default language settings through accessing the LANGUAGE SELECTION button 216. As shown in FIG. 18, the software application 102 allows the user to input alert information that includes alert contacts 112, text alert contacts 114, alert sounds 116, user information for the child and parent 118, and vehicle information 120. The software 102 may only link to the buckle component if the user activates the device 10 from the portable electronic device 100.

Figure 19:
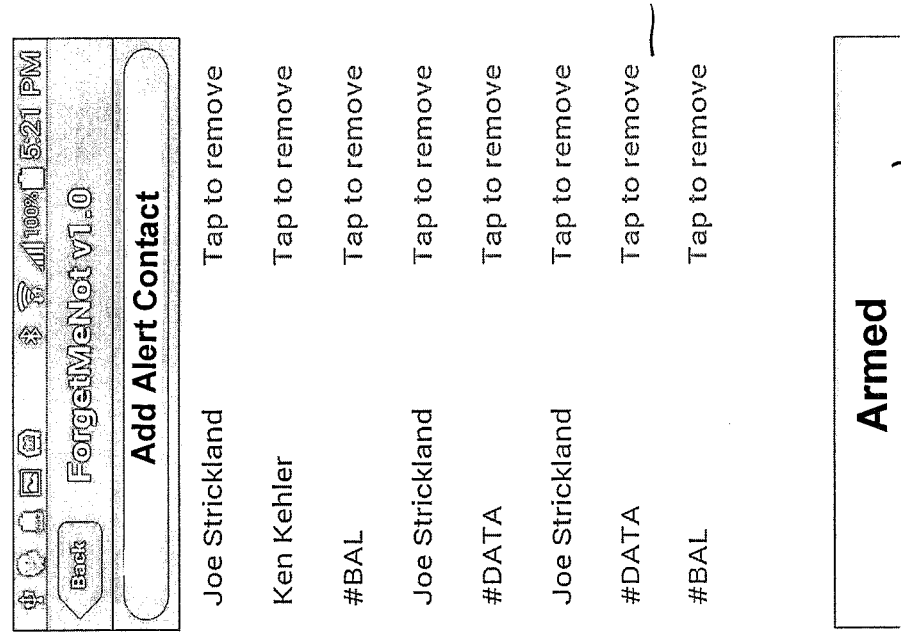
FIG. 19 is a screenshot of the portable computing device in accordance with the described embodiments.

As shown in FIG. 18, multiple alerts can be initiated through access of the button panel 201. Each button of the button panel 201 shall be discussed in turn. As shown in FIG. 19, alert contact information can be entered through accessing the ALERT CONTACTS button 112 of FIG. 18 to include contact information from the user's phone contact information. This can be populated upon installation or by the user. The user can remove undesirable contacts by selecting the contact for removal through a TAP TO REMOVE button. If the user wishes for the contact to be selected for alerts, then the user can select to add the contact as shown in the ADD CONTACT prompt 228 shown in FIG. 20.

Figure 22:
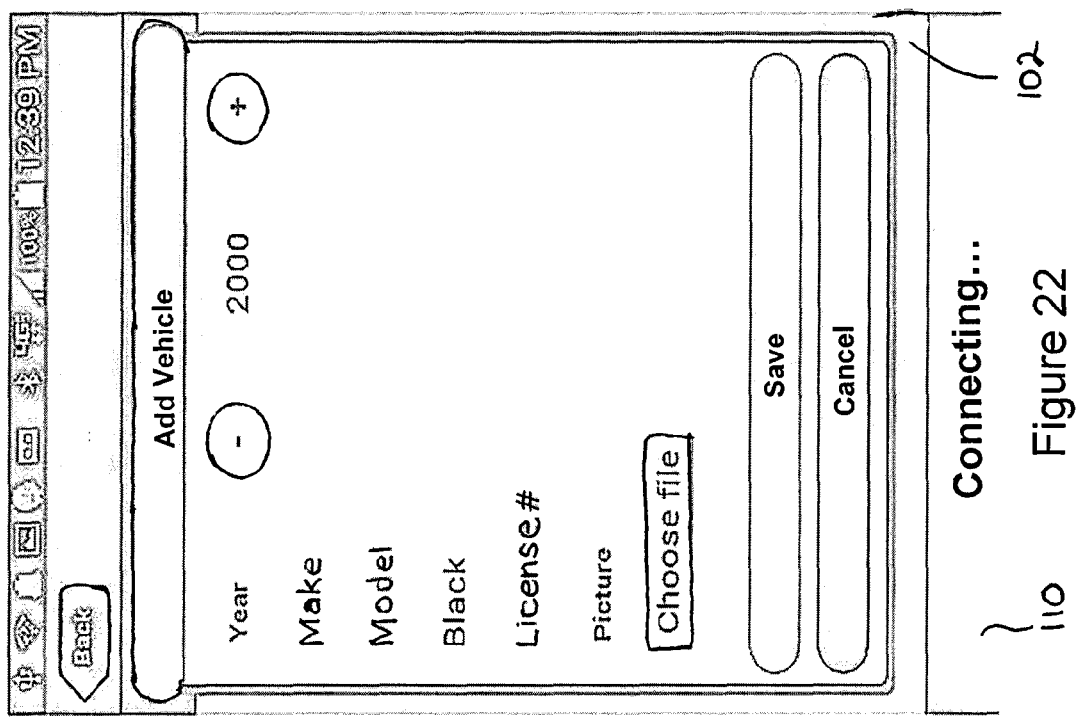
FIG. 22 is a screenshot of the portable computing device in accordance with the described embodiments.
Figure 21:
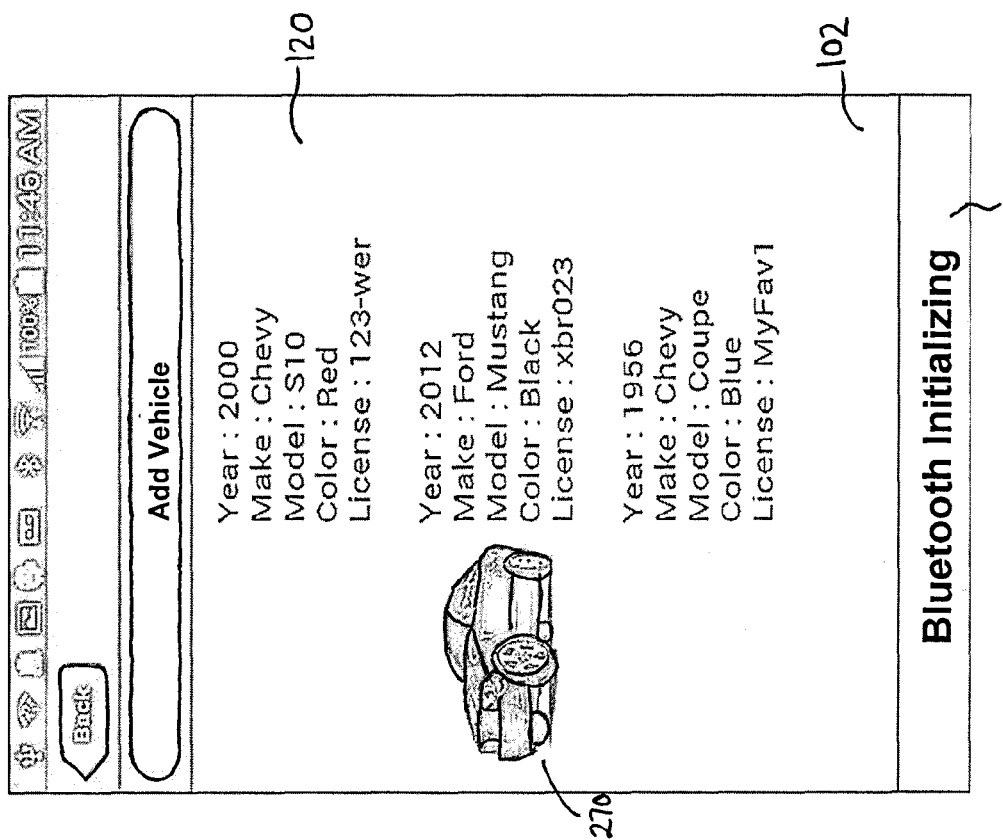
FIG. 21 is a screenshot of the portable computing device in accordance with the described embodiments.

As shown in FIGS. 21-22, vehicle information can be populated into the storage data of the software application 102 through access of the VEHICLE INFORMATION button 120. Multiple vehicles can be provided for multiple car seat systems 10. Additionally, the user may upload a photograph of the vehicle into the application. As mentioned above, the personal electronic device 100 may further include a means for capturing an image, such as a camera, a video camera or other image sensor. The software 102 allows a user to upload image data 270 into the system. It is envisioned that image data of the specific vehicle can aid EMS in finding the specific vehicle. As can be appreciated, some vehicles can be highly stylized. Image data can therefore help find specific vehicles. This data 270 may then be transmitted as part of the alert notification.

Figure 24:
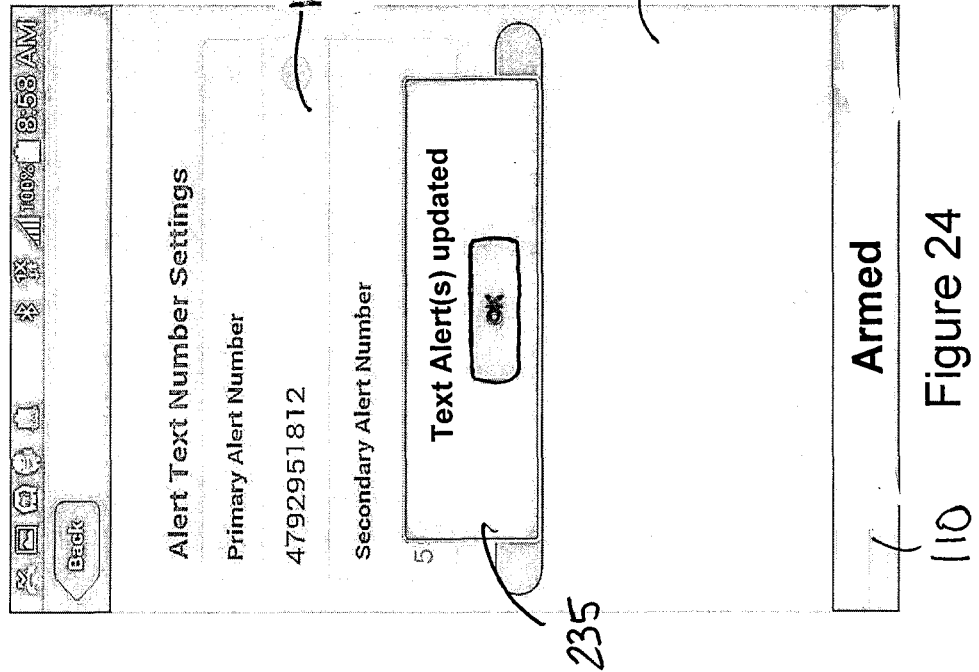
FIG. 24 is a screenshot of the portable computing device in accordance with the described embodiments.
Figure 23:
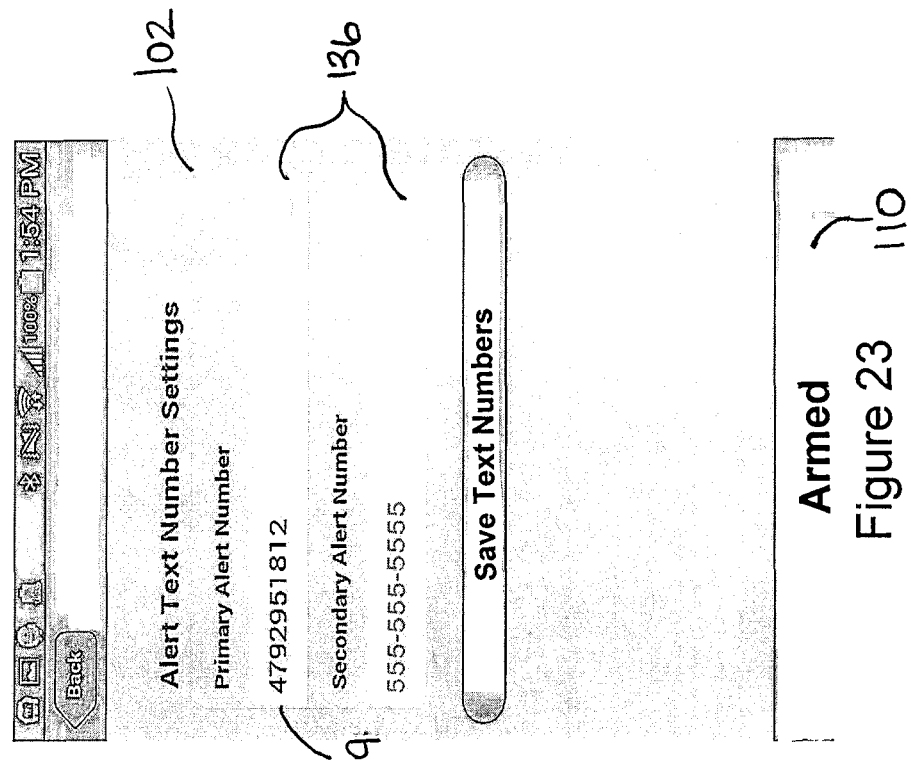
FIG. 23 is a screenshot of the portable computing device in accordance with the described embodiments.

As shown in FIGS. 23-24, text alert contacts 119 can be populated into the storage data of the software application 102 through access of the TEXT ALERTS button 114. Multiple entries 136 can be provided for text alert contacts 119 to alert multiple individuals by mobile messaging through an SMS generator (not shown) for generating SMS message. An alert screen 235 is provided upon successful entry of text alert contacts 119.

Figure 26:
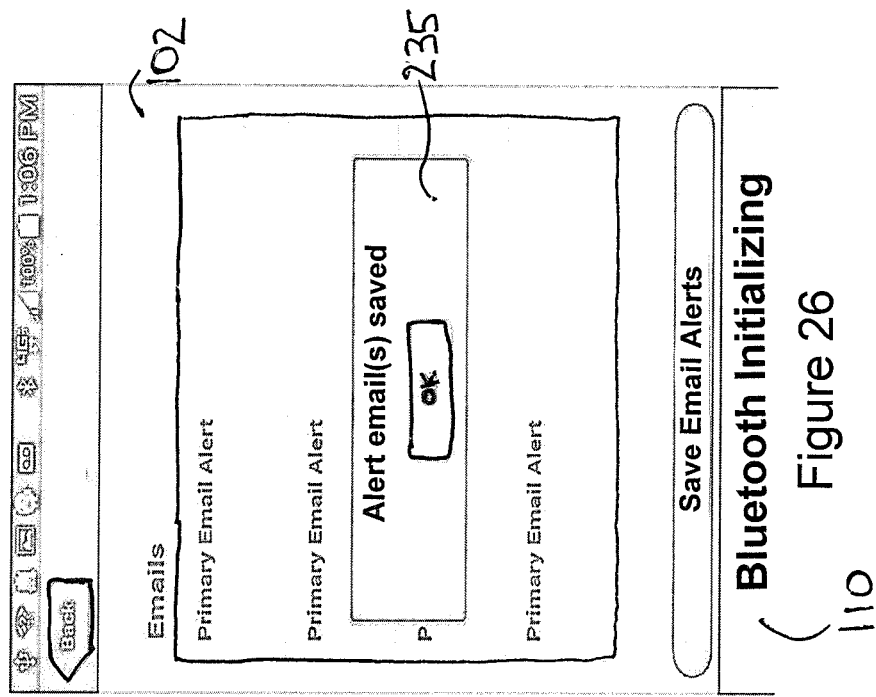
FIG. 26 is a screenshot of the portable computing device in accordance with the described embodiments.
Figure 25:
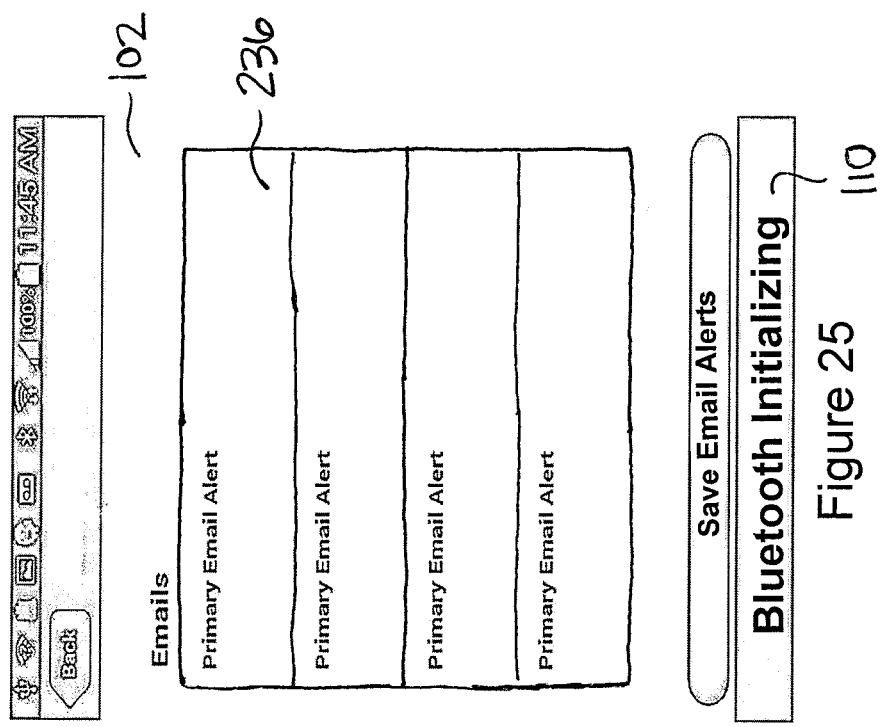
FIG. 25 is a screenshot of the portable computing device in accordance with the described embodiments.

As shown in FIGS. 25-26, e-mail contact fields 236 can be populated into the storage data of the software application 102 through access of the ALERT EMAILS button 218. Multiple entries can be provided for e-mail contacts to alert multiple individuals by e-mail through accessing the e-mail application on the portable electronic device 100. An alert screen 235 is provided upon successful entry of e-mail contacts. As additionally shown in FIGS. 25-26, the notification bar 110 may show the status of the system 10 as initializing through the alert BLUETOOTH INITIALIZING.

Figure 28:
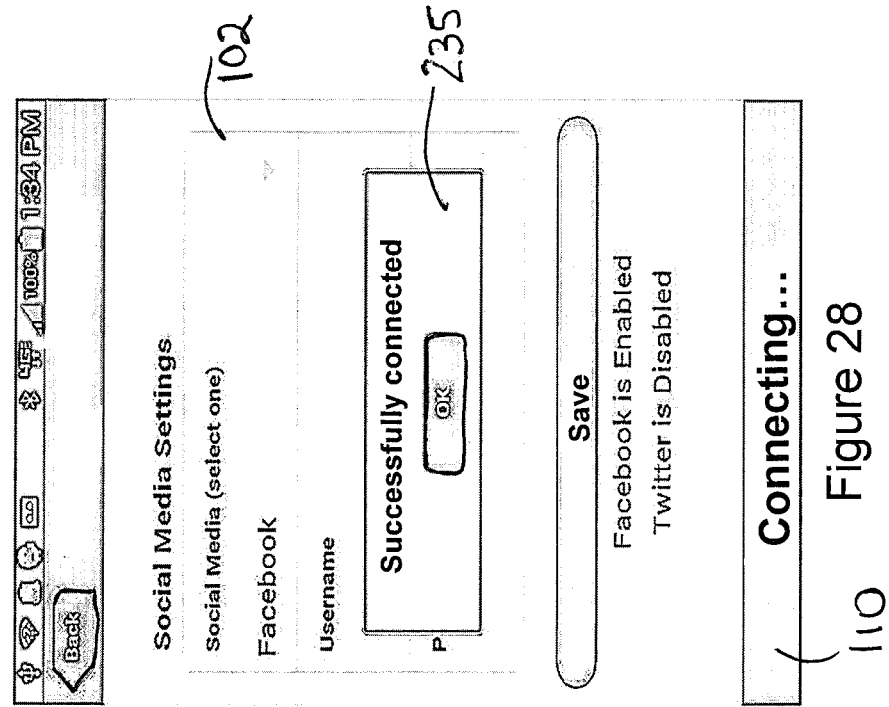
FIG. 28 is a screenshot of the portable computing device in accordance with the described embodiments.
Figure 27:
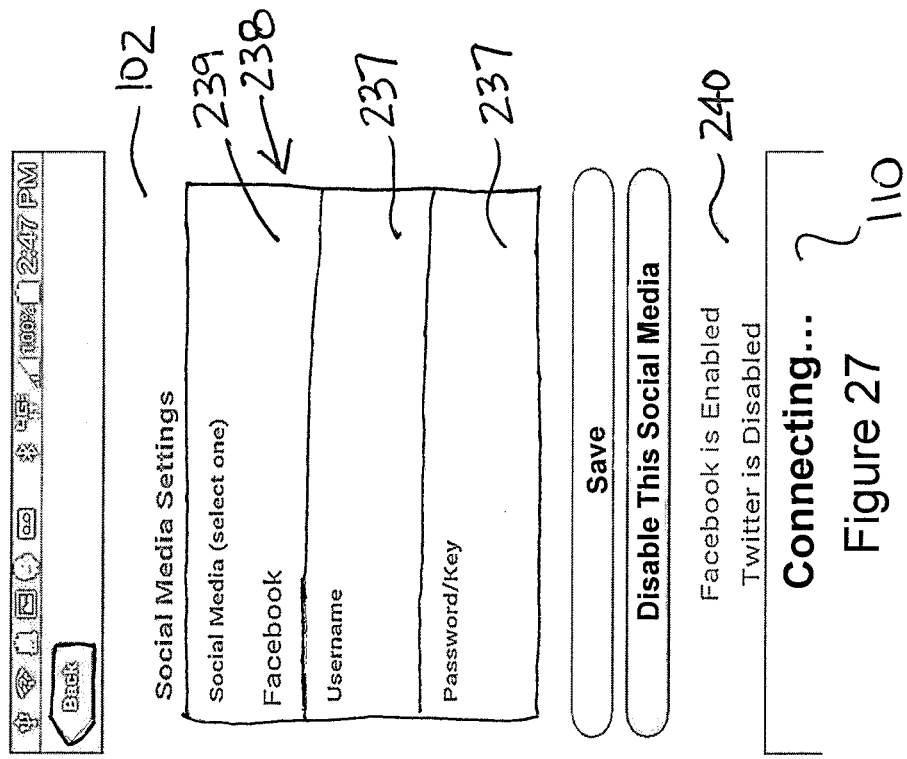
FIG. 27 is a screenshot of the portable computing device in accordance with the described embodiments.

As shown in FIGS. 27-28, social media access can be granted through populating the fields 237 of the social media window 238 accessed by selecting the ALERT SOCIAL MEDIA button 220. A drop-down menu 239 is provided to select between multiple social media networks, such as Facebook® and Twitter®, and provide a social media account profile for notification of an alert. A notification 240 at the bottom of the window 238 indicates the status (i.e. enabled or disabled) of the social media alert. An alert screen 235 is provided upon successful enablement of the social media alert. As additionally shown in FIGS. 27-28, the notification bar 110 may show the status of the system 10 as connecting through the alert CONNECTING.

As shown in FIGS. 29-30, alert sound information 116 can be selected by the user to provide customizable alert sounds upon the alarm activation through the selection of the ALERT RINGTONE button 116. As shown, a listing of sounds can be made available for selection through a drop-down menu 146 so that the user can select the most appropriate sound for that user. The user may also record a custom sound through accessing the RECORD CUSTOM SOUND button 241. An alert screen 235 is provided upon saving the sound.

Figures 31, 32:
FIG. 31 is a screenshot of the portable computing device in accordance with the described embodiments.
FIG. 32 is a screenshot of the portable computing device in accordance with the described embodiments.

As shown in FIG. 31, user information 148 for the child and parent can be populated into the software data through accessing the PARENT/CHILD INFORMATION button 118. Upon alarm activation, this user information 148 may be transmitted by the portable electronic device 100 to alert authorities or contacts of the alarm activation. The inputted user information 148 includes the name of the parent and child, the age of the child, the gender of the child, and any medical information. The software 102 additionally stores the last GPS location of the portable electronic device 100, the temperature of the child safety seat, the environment and time within the local storage data of the portable electronic device 100. As shown in FIG. 32, a photograph of the child may be uploaded to include in the user information 148. This data 280 may then be transmitted as part of the alert notification.

As shown in FIG. 33, the alarm will activate if the portable electronic device 100 moves out of range of the buckle component 34. The alarm will activate whether the application 102 is running in the foreground or background of the portable electronic device 100. Upon alarm activation, the portable electronic device 100 may, based upon the user's preselected options provide an alert chosen from the group of vibration, auditory noises, visual alerts 122 on the screen 104, SMS text 850 to the portable electronic device 100 or another portable electronic device 100 as inputted by the user in the TEXT ALERTS screen (shown in FIG. 34), social media alert, or EMS alert. In the event that a SMS text, social media alert, or EMS alert are given, the software 102 may instruct the server 200 transmit user data 270, 280 via the communications network 250. This user data 270, 280 may include vehicle information, vehicle location, vehicle images, parent names, child name, child age, child gender, child medical information, and child image data. The user may be given a chance to override the alarm, as shown in FIG. 33, through a prompt 122. If the user selects to override the alarm, the override command is stored on the device as an event in local storage and the alarm, vibration and other notifications are ceased and the override message 122 closes. If the user chooses not to override the alarm, the alarm, vibration and other notifications continue until the portable electronic device 100 moves into range of the buckle component 34.

Figure 35:
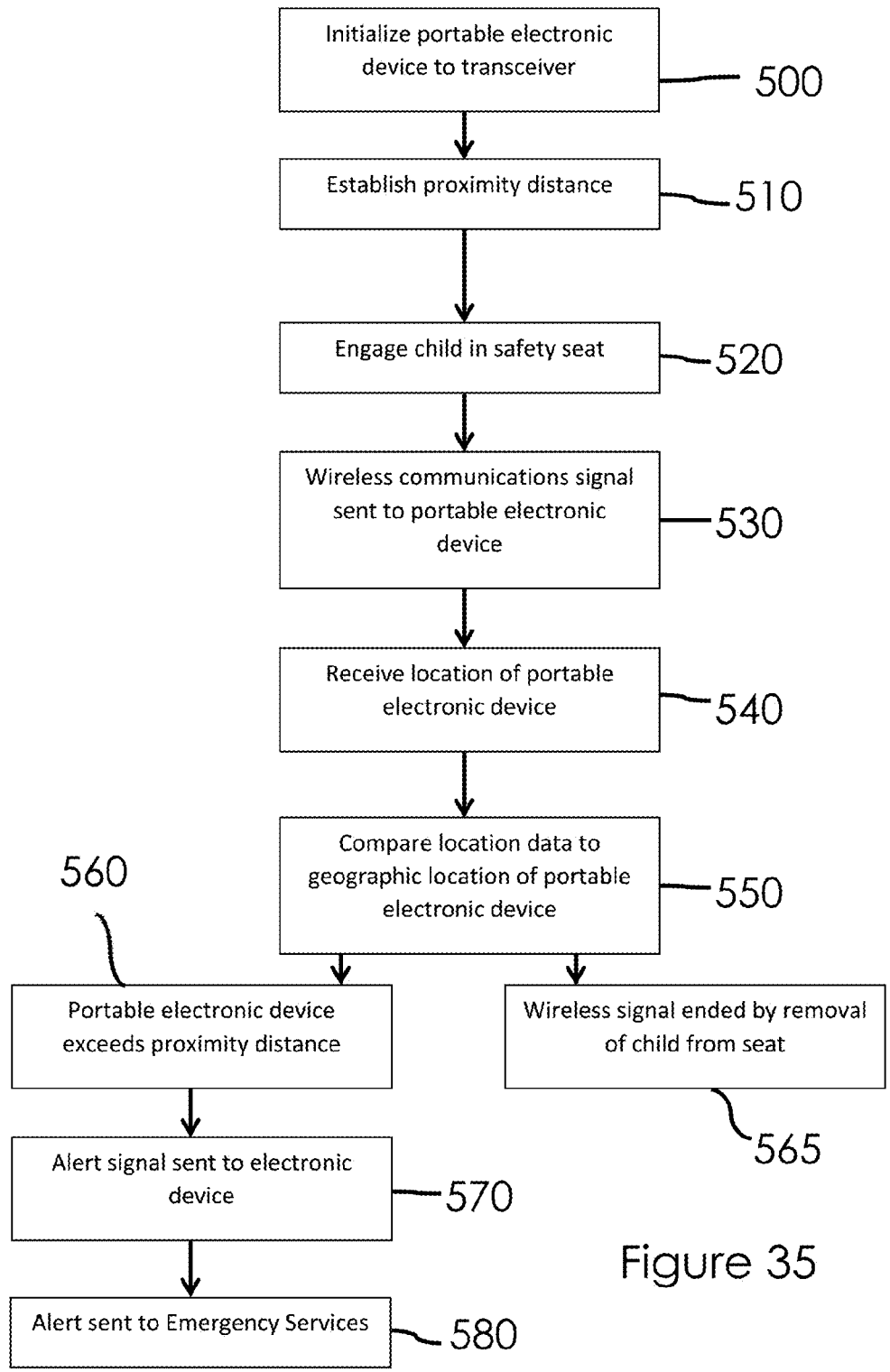
FIG. 35 is a flowchart corresponding to operations of the described embodiments of the present invention.

As shown in FIG. 35, a flowchart indicating the process of utilizing the system 10 is indicated. Upon initializing 500 the portable electronic device 100 to the buckle component 34 transceiver 70 and inputting 510 within the system 10 a proximity distance, or the allowable distance between the portable electronic device 100 to the buckle component, the child maybe engaged 520 safely in the seat. A wireless communication is sent 530 to the portable electronic device and the location of the portable electronic device is communicated 540 to the transceiver. The location of the portable electronic device and the location data of the transceiver are compared 550 to verify the portable electronic device is within the proximity distance. If the proximity distance is exceeded 560, then an alert is sent 570 to the electronic device, to Emergency Services 580, or through the other means discussed herein. The system continues to monitor the proximity distance until the child is unbuckled from the seat and the wireless signal is ended 565.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically referring to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures.

What is claimed is:

1. An alert system for monitoring a child buckled in a child safety seat in a vehicle, the system comprising:
    a child safety seat having a lap buckle having two or more buckle portions capable of engaging with each other to secure a child within said safety seat, said lap buckle further comprising at least one transceiver for wireless communication and a sensor configured to activate said at least one transceiver to generate a wireless signal upon buckling of the child safety seat;
    at least one portable device configured to receive said wireless signal, said at least one portable device programmably controlled to monitor that said at least one portable device remains within a predetermined programmed distance range from said child safety seat while said two or more buckle portions are engaged with each other;
    said portable electronic device further comprising:
        a computing platform having an input for inputting user data;
        a processor;
        a memory in communication with said processor; and
        a mechanism capable of communicating data over a wireless communication network to transmit an alarm notification and said user data to at least one user-selected contact;
        said user data elected from the group comprising: vehicle location data, vehicle information data, vehicle image data, parent name data, child name data, child age data, child gender data, child medical data, and child image data;
        said alarm notification transmitted by said mechanism to at least one user-selected contact selected from the group comprising: a pre-recorded voice message, an email message, and a text message;
    wherein said at least one portable device transmits an alarm signal if said predetermined programmed distance range is exceeded by said at least one portable device;
    wherein said alarm signal includes at least one alarm selected from the group comprising an audible alarm, a visual alarm, and a vibration alarm.

2. The alert system of claim 1, wherein said alarm notification is further transmitted to a social media network account profile.

3. A system for monitoring occupancy of a child safety seat in a vehicle, the system comprising:
    a child safety seat having a buckle for securing a child within said safety seat, said buckle comprising at least one transceiver for transmitting a wireless signal;
    a portable device configured to receive said wireless signal, said portable device capable of communicating data over a wireless communications network and having a computing platform for inputting a user's data and a memory for storing said user's data and a program for automatically performing the following steps:
    storing a proximity distance for said portable device to be located from said transceiver located within the child safety seat;
    comparing, by the portable device, proximate location data for said portable device in relation to said transceiver located within the child safety seat;
    providing an alarm signal based on the result of said comparison of said proximate location data with said proximity distance, said alarm signal selected from the group comprising an audible alarm, a visual alarm, and a vibration alarm;
    transmitting said user's data to at least one user-selected contact, wherein said user data is selected from the group comprising: vehicle location data, vehicle information data, vehicle image data, parent name data, child name data, child age data, child gender data, child medical data, and child image data; and
    transmitting an alarm notification to at least one user-selected contact, said alarm notification selected from the group comprising: a pre-recorded voice message, an email message, and a text message.

4. The system of claim 3, wherein said alarm notification is further transmitted to a social media network account profile.

5. An alert system for monitoring a child buckled in a child safety seat in a vehicle, the system comprising:
    a child safety seat having a buckle for securing a child within said safety seat, said buckle further comprising at least one transceiver for wireless communication and a sensor configured to activate said at least one transceiver to generate a wireless signal upon buckling of the child safety seat;

at least one portable device configured to receive said wireless signal and having a programmed distance range from said child safety seat, said at least one portable device further comprising:
- a computing platform for inputting user data;
- a processor;
- a memory in communication with said processor and storing said user data; and
- a device capable of communicating data over a wireless communication network;

wherein said at least one portable device provides an alarm signal and transmits said user data to at least one user-selected contact if said programmed distance range is exceeded by said at least one portable device, said user data selected from the group comprising vehicle data, vehicle image data, parent name data, child name data, child age data, child gender data, child medical data, and child image data; and wherein said alarm signal includes at least one alarm selected from the group comprising an audible alarm, a visual alarm, and a vibration alarm.

6. The alert system of claim 5, wherein said user data is selected from the group comprising: vehicle data, vehicle image data, parent name data, child name data, child age data, child gender data, child medical data, and child image data.

7. The alert system of claim 5, wherein said alarm notification transmitted to at least one user-selected contact is selected from the group comprising: a pre-recorded voice message, an email message, and a text message.

8. The alert system of claim 5, wherein said alarm notification is further transmitted to a social media network account profile.

\* \* \* \* \*